United States Patent
Va et al.

(10) Patent No.: US 12,267,783 B2
(45) Date of Patent: Apr. 1, 2025

(54) METHODS AND APPARATUS FOR UE POWER SAVING USING SIDE INFORMATION AT THE UE

(71) Applicant: Samsung Electronics Co., Ltd., Suwon-si (KR)

(72) Inventors: Vutha Va, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 17/929,605

(22) Filed: Sep. 2, 2022

(65) Prior Publication Data

US 2023/0262602 A1    Aug. 17, 2023

Related U.S. Application Data

(60) Provisional application No. 63/310,826, filed on Feb. 16, 2022.

(51) Int. Cl.
*H04W 52/02* (2009.01)
*H04W 8/18* (2009.01)
*H04W 24/02* (2009.01)

(52) U.S. Cl.
CPC ... *H04W 52/0248* (2013.01); *H04W 52/0258* (2013.01)

(58) Field of Classification Search
None
See application file for complete search history.

(56) References Cited

U.S. PATENT DOCUMENTS

| | | |
|---|---|---|
| 8,498,652 B2 | 7/2013 | Norlund et al. |
| 9,900,232 B2 | 2/2018 | Kanamarlapudi et al. |
| 10,057,852 B2 | 8/2018 | Seo et al. |
| 11,228,487 B2 | 1/2022 | He et al. |
| 2013/0301500 A1 | 11/2013 | Koc et al. |
| 2014/0036748 A1 | 2/2014 | Mukherjee et al. |

(Continued)

FOREIGN PATENT DOCUMENTS

WO    2021216485 A1    10/2021

OTHER PUBLICATIONS

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

(Continued)

*Primary Examiner* — Duc T Duong

(57) ABSTRACT

A method performed by a user equipment (UE) includes obtaining UE side information. The method includes, based on the obtained UE side information, detecting a service type of an application executing on the UE and estimating a supportable throughput. The method includes determining a UE-preferred configuration based on the detected service type and the estimated supportable throughput. The method includes determining whether the UE-preferred configuration is different from a current UE configuration. The method includes controlling transmission of the UE-preferred configuration to an external network device, based on a result of the determination of whether the UE-preferred configuration is different from the current UE configuration.

20 Claims, 13 Drawing Sheets

(56) References Cited

U.S. PATENT DOCUMENTS

| | | | |
|---|---|---|---|
| 2014/0133294 A1* | 5/2014 | Horn | H04W 28/0247 |
| | | | 455/436 |
| 2016/0100360 A1 | 4/2016 | Liu et al. | |
| 2017/0019229 A1 | 1/2017 | Torikoshi | |
| 2017/0019948 A1 | 1/2017 | Baghel et al. | |
| 2017/0295546 A1 | 10/2017 | Young et al. | |
| 2018/0211364 A1* | 7/2018 | Nam | G06F 3/147 |
| 2020/0100176 A1* | 3/2020 | Pateromichelakis | |
| | | | H04W 28/0268 |
| 2020/0178172 A1 | 6/2020 | Thangarasa et al. | |
| 2020/0383168 A1 | 12/2020 | Nagasaka et al. | |
| 2021/0377860 A1 | 12/2021 | Ma et al. | |
| 2021/0410013 A1* | 12/2021 | Yang | H04L 47/805 |

OTHER PUBLICATIONS

International Search Report and Written Opinion issued Feb. 9, 2023 regarding International Application No. PCT/KR2022/017028, 7 pages.

Apple Inc., "UE Power Saving Techniques", 3GPP TSG-RAN WG1 Meeting #96, R1-1902771, Feb. 2019, 15 pages.

Extended European Search Report issued Oct. 10, 2024 regarding Application No. 22927449.3, 9 pages.

\* cited by examiner

METHODS AND APPARATUS FOR UE POWER SAVING USING SIDE INFORMATION AT THE UE

CROSS-REFERENCE TO RELATED APPLICATION(S) AND CLAIM OF PRIORITY

This application claims priority under 35 U.S.C. § 119(e) to U.S. Provisional Patent Application No. 63/310,826 filed on Feb. 16, 2022. The above-identified provisional patent application is hereby incorporated by reference in its entirety.

TECHNICAL FIELD

This disclosure relates generally to wireless communication systems. More specifically, this disclosure relates to methods for user equipment (UE) power saving leveraging side information at the UE.

BACKGROUND

The 5G wireless communication system operates within higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. A communication system includes a downlink (DL) that conveys signals from transmission points such as Base Stations (BSs), eNodeBs, or gNodeBs to UEs. Also, the communication system includes an uplink (UL) that conveys signals from UEs to reception points such as BSs, eNodeBs, or gNodeBs. A UE, also commonly referred to as a terminal or a mobile station, may be fixed or mobile and may be a cellular phone, a personal computer device, etc. A BS, eNodeB, or gNodeB is generally a fixed station, and may also be referred to as an access point or other equivalent terminology.

SUMMARY

This disclosure provides methods for UE power saving leveraging side information at the UE.

In one embodiment, a method for UE power saving leveraging side information at the UE is provided. The method is performed by a UE. The method includes obtaining UE side information. The method includes, based on the obtained UE side information, detecting a service type of an application executing on the UE and estimating a supportable throughput. The method includes determining a UE-preferred configuration based on the detected service type and the estimated supportable throughput. The method includes determining whether the UE-preferred configuration is different from a current UE configuration. The method includes controlling transmission of the UE-preferred configuration to an external network device, based on a result of the determination of whether the UE-preferred configuration is different from the current UE configuration.

In another embodiment, a UE for UE power saving leveraging side information at the UE is provided. The UE includes a transceiver, and a processor operably coupled to the transceiver. The processor is configured to obtain UE side information. The processor is configured to, based on the obtained UE side information, detect a service type of an application executing on the UE and estimate a supportable throughput. The processor is configured to determine a UE-preferred configuration based on the detected service type and the estimated supportable throughput. The processor is configured to determine whether the UE-preferred configuration is different from a current UE configuration. The processor is configured to control transmission of the UE-preferred configuration to an external network device, based on a result of the determination of whether the UE-preferred configuration is different from the current UE configuration.

In yet another embodiment a non-transitory computer readable medium includes program code that, when executed by a processor of the device, causes the device to: obtain UE side information; based on the obtained UE side information, detect a service type of an application executing on the UE and estimate a supportable throughput; determine a UE-preferred configuration based on the detected service type and the estimated supportable throughput; determine whether the UE-preferred configuration is different from a current UE configuration; and control transmission of the UE-preferred configuration to an external network device, based on a result of the determination of whether the UE-preferred configuration is different from the current UE configuration.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B,"

"at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

Definitions for other certain words and phrases may be provided throughout this patent document. Those of ordinary skill in the art should understand that in many if not most instances, such definitions apply to prior as well as future uses of such defined words and phrases. None of the description in this application should be read as implying that any particular element, step, or function is an essential element that must be included in the claim scope. The scope of patented subject matter is defined only by the claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
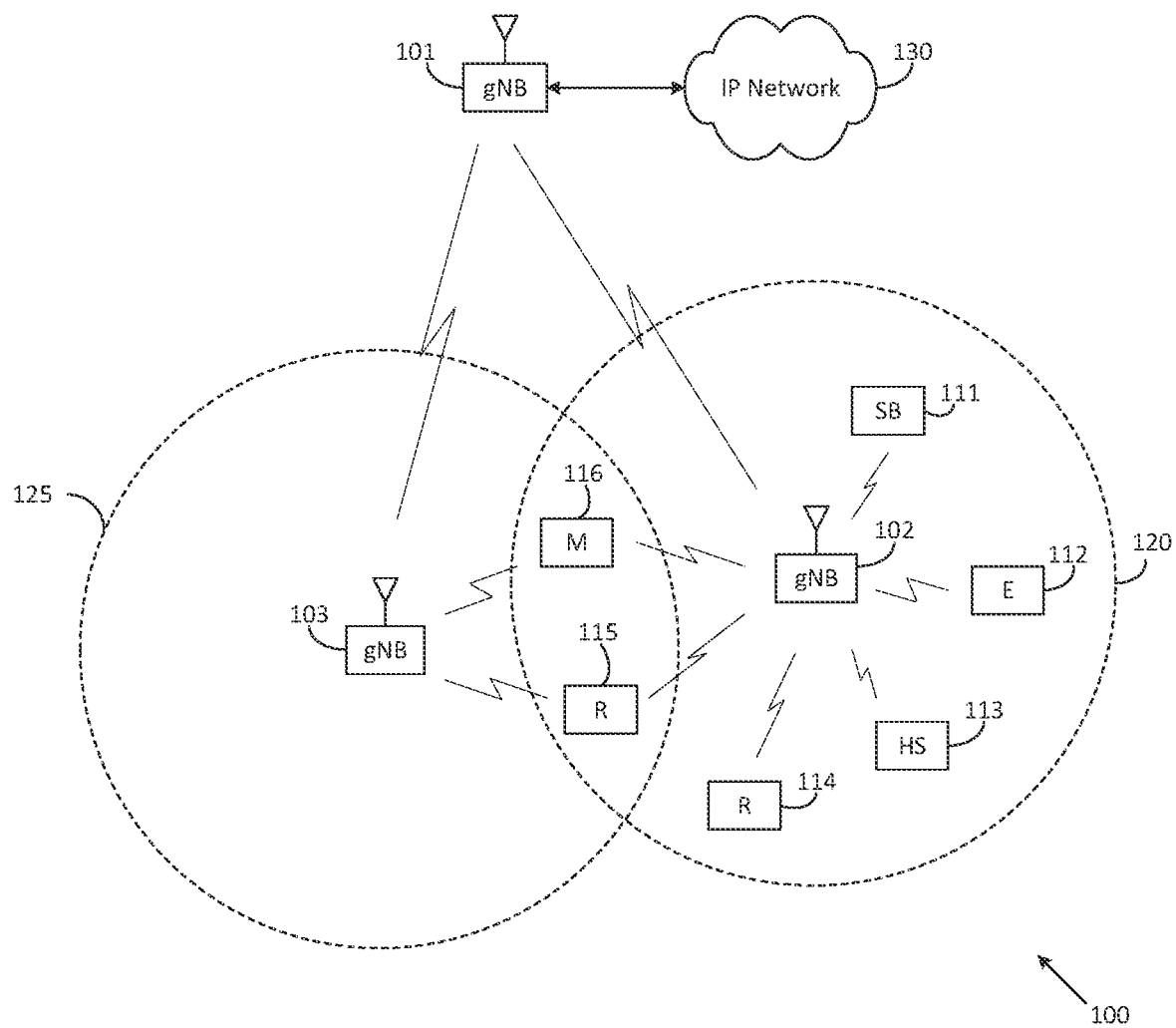
FIG. 1 illustrates an example wireless network according to this disclosure.

FIGS. 1 through 16B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

Envisioning a wide range of applications, the 5th generation (5G) cellular communications standards are designed to be highly flexible; however, this flexibility comes at the cost of a more power consumption. Battery life of a mobile device has a great impact on the user experience, so reduction in power consumption at the user equipment (UE) side is imperative for the success of 5G wireless communications. Realizing this, the present disclosure provides solutions that help enable the UE to save power. A new feature was introduced in 3GPP Release 16 specifications that provides the UE the capability to convey its preferred configurations to the network side. With this capability to convey its preferred configurations to the network side, the UE can use available information on the UE to reduce the power consumption by getting rid of unnecessary requirements that do not affect the user experience. For example, for a non-live video streaming application, latency of 10 milliseconds (ms) or even 100 ms will not affect the user experience much. In this example, the present disclosure provides a UE that can select a configuration that might have high latency of tens of ms with a lower power consumption rather than selecting a configuration that supports low latency at a few ms. Aspects of the present disclosure may be applied to 5G communication systems, 6G or even later releases, which may use THz bands.

This disclosure describes various solutions for the UE to take advantage of the information available to it to determine a UE-preferred 5G configuration aimed at saving power while maintaining a good user experience. The information available to the UE includes side information: IP packet history, network status, and UE status. IP packet history could be used to detect the type of applications that the user is running on the device. The network status can be used to estimate the performance level (e.g., in terms of data rate) that the network can support. The UE status can be used to make proper prioritization in selecting the configuration that the UE prefers; for example, if the UE has low battery power, then more weight could be allocated to power saving rather than latency reduction.

To meet the demand for wireless data traffic which has increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as below 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a proprietary IP network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, 6G, LTE, LTE-A, WiMAX, WiFi, or other wireless communication techniques.

Depending on the network type, other well-known terms may be used instead of "gNodeB" or "gNB," such as "base station," "access point," "eNodeB," or "eNB." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses a gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, the disclosed embodiments of the wireless network 100 are specially adapted to reduce UE power consumption based on UE side information.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of Us and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2:
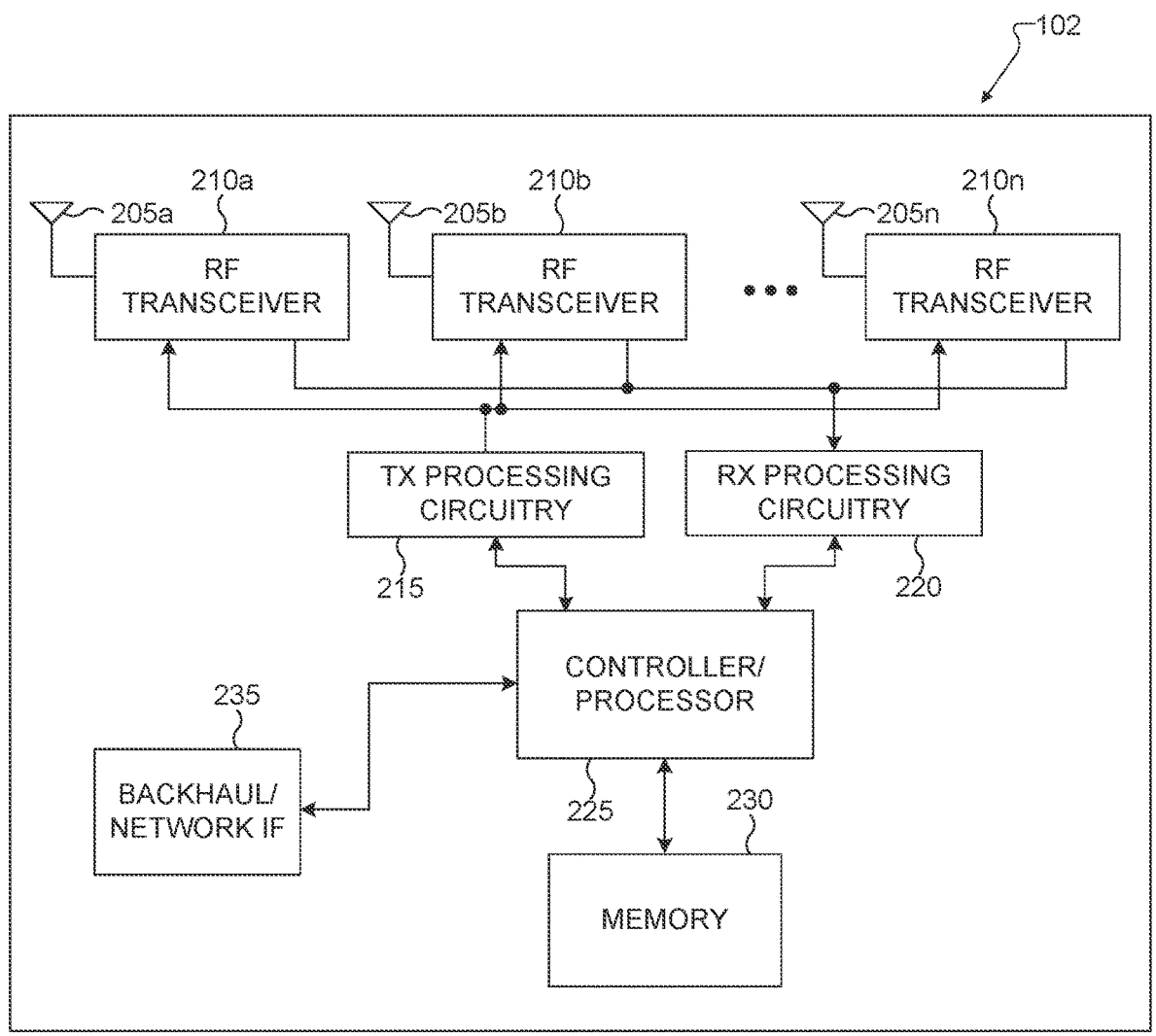
FIG. 2 illustrates an example gNodeB (gNB) according to this disclosure.

FIG. 2 illustrates an example gNB 102 according to this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the disclosed embodiments of the UE 116 are specially adapted to reduce UE power consumption based on UE side information.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
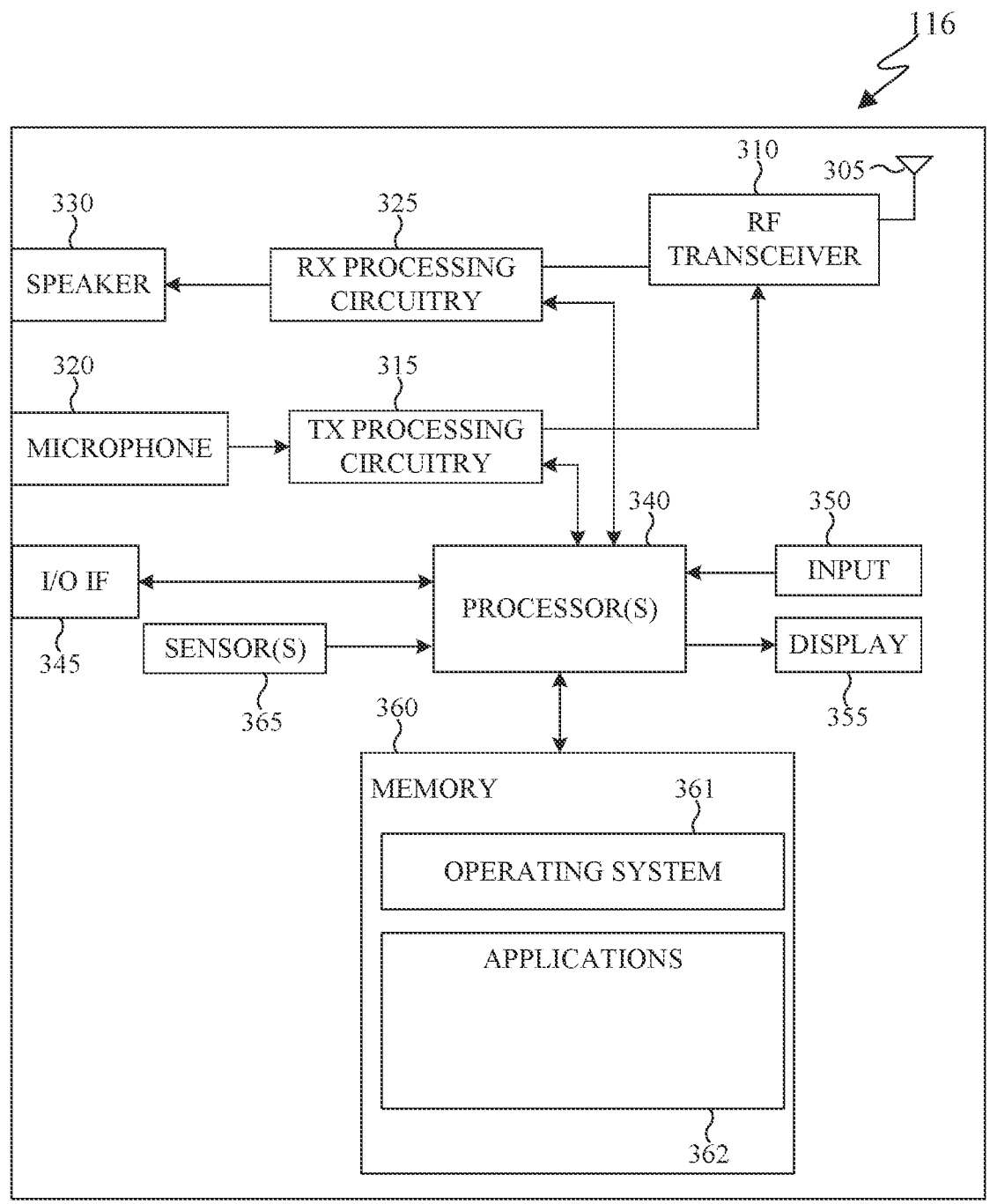
FIG. 3 illustrates an example user equipment (UE) according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes an operating system (OS) program 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

As described in more detail below, the disclosed embodiments of the network device, such as gNB 102, are specifically adapted to reduce UE power consumption based on UE side information.

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
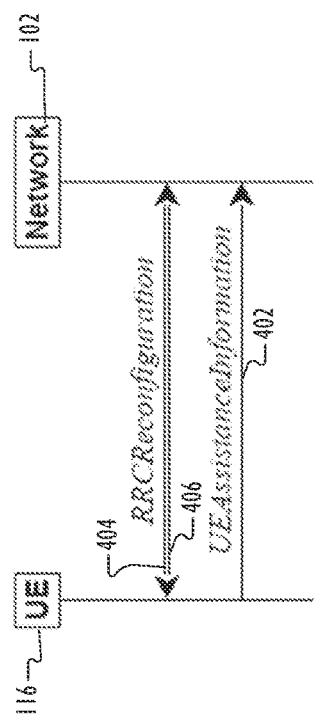
FIG. 4 illustrates an example transmission of UE Assistance Information in accordance with embodiments of this disclosure.

FIG. 4 illustrates an example transmission of UE Assistance Information in accordance with embodiments of this disclosure. From among the UE 116 and an external network device (such as gNB 102), a power-saving UE configuration could be best decided by the UE 116 because an external network device cannot know full device state of the UE 116. The following standard specification document is hereby incorporated by reference into the present disclosure: 3GPP TS 38.311 V16.5.0 (herein referred to as "Release 16"). Release 16 introduces a UE assistance information 402 to allow a UE to feedback the UE's preference to a network node of the wireless network 100 (such as the gNB 102) to achieve power saving. Within the UE assistance information 402, the UE 116 can report delay budget, overheating, In-Device Coexistence (IDC), Grant assistance information for sidelink, or the UE's preference in being provisioned with reference time information. Also within the UE assistance information 402, the UE 116 can report a power-saving UE configuration, which can include any of the following: Preferred discontinuous reception (DRX) configuration, preferred maximum number of component carriers (CC), preferred maximum number of MIMO layers, preferred scheduling offset and cross-slot scheduling, or preferred Radio Resource Control (RRC) state. The number of CC is related to carrier aggregation (related to bandwidth); the number of MIMO layers is related to the number of parallel data streams. Regarding the number of CC and the number of MIMO layers, a larger number can support higher throughput but also consume more power. Scheduling offset and cross-slot scheduling are used to avoid unnecessary buffering of the signal or to avoid having to keep the radio on that the UE has to monitor.

Communications for an initial setup between the UE and the network occurs prior to the UE 116 transmitting the UE Assistance information 402. In the example shown, the UE 116 receives an RRC Reconfiguration 404 message and transmits an RRC Reconfiguration Complete 406 message prior to transmitting the UE assistance information 402.

Figure 5:
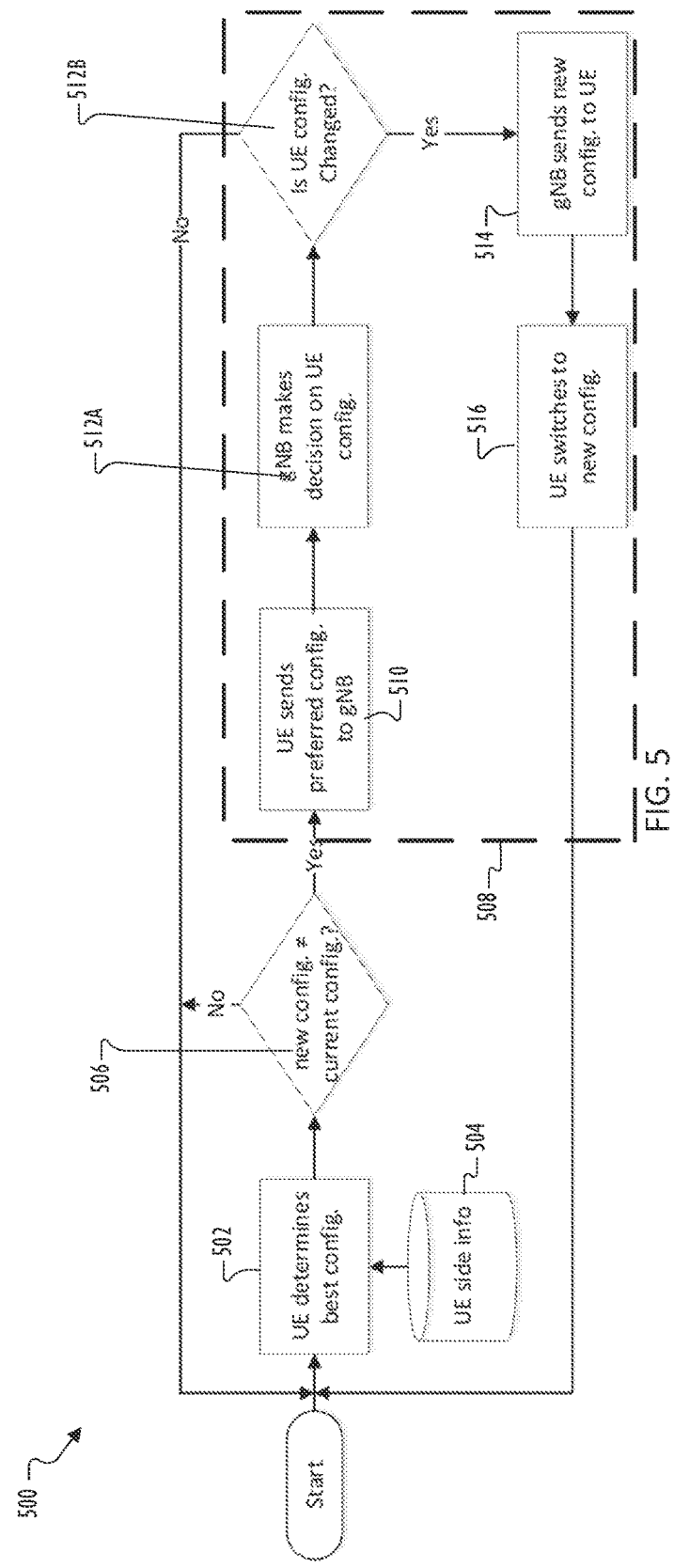
FIG. 5 illustrates an overview flowchart of a method in which a UE-preferred configuration is determined by the UE, selectively transmitted to an external network device, and selectively accepted by the external network device for instructing the UE to change the configuration of the UE in accordance with embodiments of this disclosure.

FIG. 5 illustrates an overview flowchart of a method 500 in which a UE-preferred configuration is determined by the UE 116, selectively transmitted to an external network device (such as gNB 102), and selectively accepted by the external network device for instructing the UE to change the configuration of the UE in accordance with embodiments of this disclosure. The embodiment of the method 500 shown in FIG. 5 is for illustration only, and other embodiments could be used without departing from the scope of this disclosure.

The gNB 102 upon receiving the UE-preferred configuration may accept the configuration as is or it may make some changes to accommodate the selection (e.g., while considering its own constraints) or it may choose to ignore the UE's suggested configuration altogether. If the gNB 102 decides to ignore the UE-preferred configuration, there may be no additional action with this event. If the gNB 203 decides to change the UE configuration (either the gNB 102 accepts the UE-preferred configuration or selects some new configuration that is different than the UE's currently active configuration), the gNB 102 may send the new configuration it selected to the UE. Upon receipt of the new configuration from the gNB 102, the UE 116 then applies the new configuration.

At block 502, the UE 116 determines a UE-preferred configuration, which may be referred to as the "best" configuration. Under various circumstances, the UE-preferred configuration resolves competing interests by increased power savings at the expense of a reduction in quality of user experience, thereby optimizing the UE configuration to save power while avoiding a dissatisfying quality of user experience. In certain embodiments, the UE-preferred configuration assigns a higher priority to power savings compared to operation parameters that are specified by the applications 362 aiming to provide a good quality of user experience.

The UE 116 determines the UE-preferred configuration based on raw information sources, such as UE side information 504. The UE 116 uses this UE side information 504 to select a set of configurations that could reduce UE power consumption without sacrificing performance quality (e.g., the current quality of user experience). Herein, UE side information 504 includes IP traffic history, network status, and UE status of the UE 116. The UE side information 504 can be stored in the memory 360 of the UE 116. To determine the UE-preferred configuration, the UE 116 converts these raw information sources into intermediate and interpretable information (herein referred to as "intermediate information") for controlling the UE 116 for optimizing the UE-preferred configuration to save power. Examples of the intermediate information includes application category, and supportable throughput.

At block 506, the UE 116 determines whether to transmit the UE-preferred configuration to the gNB 102 based on satisfaction of a transmission criterion. If the UE-preferred configuration is different than the current UE configuration, the UE 116 may send this newly determined UE-preferred configuration to the gNB 102. Particularly, when the transmission criterion is not satisfied, the UE 116 does not transmit the UE-preferred configuration to the gNB 102, and thus the transmission criterion helps the UE 116 to avoid unnecessary consumption of resources (e.g., CPU usage, electric/battery energy, over-the-air bandwidth) that would be consumed if a transmission were to be performed. In the example shown, the transmission criterion is satisfied if the UE-preferred configuration is different from the current UE configuration. The current UE configuration can be the received via a most recently received RRC Reconfiguration 404. In other examples, the transmission criterion may be based on an overhead associated with reconfiguration.

Note that to provide a simple overview, in FIG. 5 simple criterion "new config. current config." is shown at block 506 for deciding whether the UE will initiate configuration changes. In a practical implementation, one or more additional criteria may be added here to limit overhead increase in reconfiguration. In one implementation, a prohibit timer may be utilized. Whenever the UE initiates a configuration change (i.e., UE sends UE-preferred configuration to gNB) at block 510, the prohibit timer is activated, and the UE may not attempt another reconfiguration until the prohibit timer expires. This prohibit timer may also be activated when the gNB 102 sends a new network-preferred configuration to the UE 116, though the prohibition timer duration may be selected to a different value. In another practical implementation, the UE 116 may also use reconfiguration rejection counts before it gives up. Reconfiguration rejection occurs when the UE 116 sends (at block 510) the UE-preferred configuration to the gNB 102 and either did not receive any response back (i.e., after some time out duration) from the gNB 102 or the UE 116 received a rejection response from the gNB 102. In this case, the UE 116 may count the number of rejections, and when the number of rejections in consecutive trials is larger than some threshold (e.g., 3), then the UE 116 activates the prohibition timer of the UE.

The block 508 includes blocks 510, 512, 514, 516 and 518. Block 508 shows that the UE assistance information 402 provides a medium for UE to convey the UE-preferred configuration to the gNB 102, however, according to Release 16, the wireless network is not required to accept the UE-preferred configuration. At block 510, the UE sends the UE-preferred configuration to the gNB 102. At block 512A and 512B (generally 512), the gNB 102 decides whether to accept or reject UE-preferred configuration and whether to send a new UE configuration to the UE 116 (for example, via an RRC Reconfiguration 404, or other instruction to the UE to reconfigure the UE). Particularly, at block 512A, gNB 102 selects a new network-preferred UE configuration at block 512A. The gNB 102 accepts the UE-preferred configuration if the new network-preferred UE configuration is the same as the UE-preferred configuration. The gNB 102 rejects the UE-preferred configuration if the new network-preferred UE configuration is different from the UE-preferred configuration. At block 512, in response to receiving the UE Assistance information 402, the gNB 102 responds by transmitting the new network-preferred UE configuration to the UE 116 after determining that the current UE configuration is different from the new network-preferred UE configuration. Particularly, at block 512B, the gNB 102 determines whether the new network-preferred UE configuration is different from (e.g., has changed compared to) the UE's current configuration. In response to a determination that the new network-preferred UE configuration is the same as the UE's current configuration, the gNB 102 does not send the new network-preferred UE configuration to the UE 116, and the method 500 returns to block 502. Effectively, the gNB 102 rejects the UE-preferred configuration if the new network-preferred UE configuration selected at block 512A is the same as (e.g., remains unchanged compared to) the current UE configuration.

At block 514, in response to a determination that the new network-preferred UE configuration is different from the UE's current configuration, the gNB 102 sends the new network-preferred UE configuration to the UE 116. At block 516, the UE 116 switches to the new network-preferred UE configuration received from the gNB 102, and the method 500 returns to block 502.

Figure 6A:
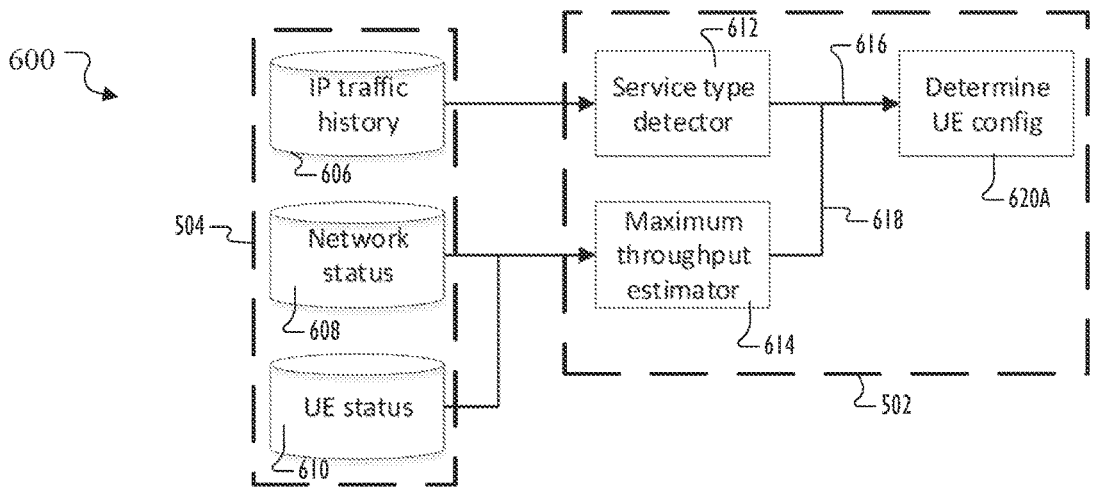
FIGS. 6A, 6B, and 6C each illustrate an example of determining intermediate information based on UE side information and determining the UE-preferred configuration based on the intermediate information in accordance with embodiments of this disclosure.
Figure 6B:
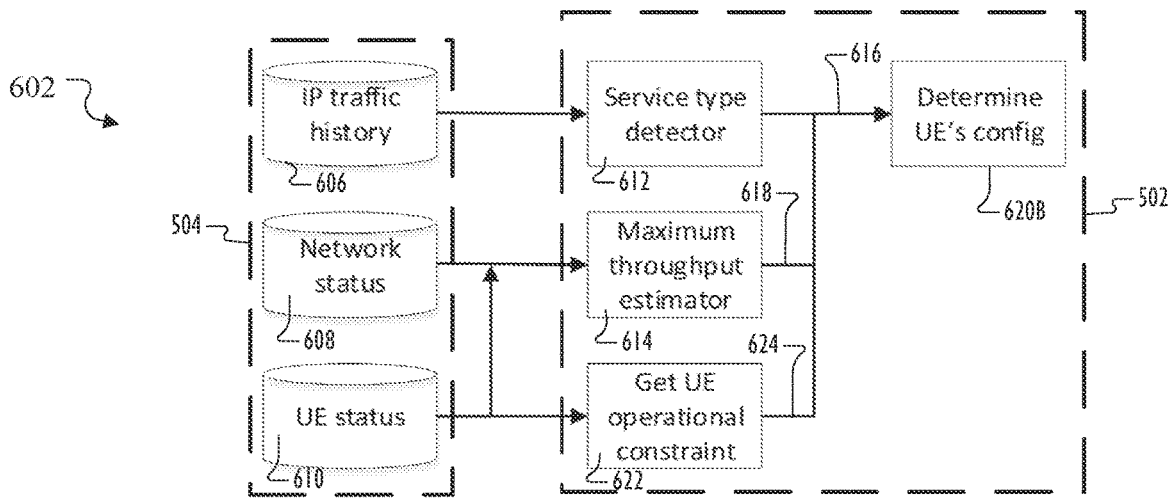
Figure 6C:
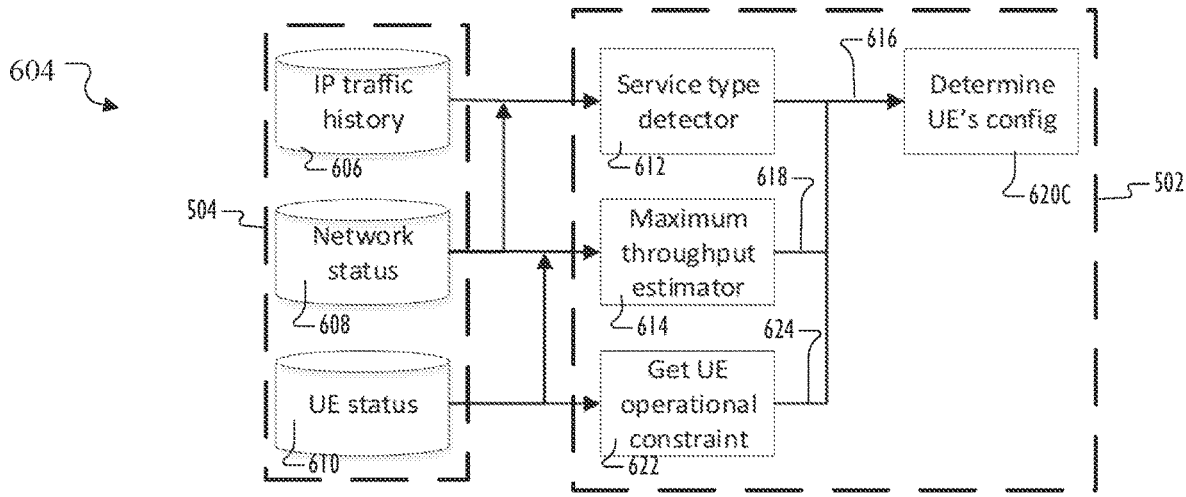

FIGS. 6A, 6B, and 6C each illustrate an example of method 600, 602, 604 determining intermediate information based on UE side information 504 and determining the UE-preferred configuration based on the intermediate information in accordance with embodiments of this disclosure. The embodiments of determining intermediate information shown in FIGS. 6A, 6B, and 6C are for illustration only, and other embodiments could be used without departing from the scope of this disclosure. To avoid duplicative descriptions, some of the features (e.g., 502 and 504) of the method 500 of FIG. 5 are also included in the methods 600, 602, 604 of FIGS. 6A-6C.

Referring to a first embodiment in FIG. 6A, the UE side information 504 includes IP traffic history 606, network status 608, and UE status 610. Within block 502, to determine intermediate information, the UE 116 includes a service type detector 612 and a throughput estimator 614. Also at block 620A within block 502, the UE 116 determines the UE-preferred configuration based on a detected service type 616 (output by the service type detector 612) and an estimated supportable throughput 618 (output by the throughput estimator 614). For ease of explanation, details regarding each of these components will be described below, following a description of structural differences between FIGS. 6A-6C.

Referring to a second embodiment in FIG. 6B, in addition to the embodiment shown in FIG. 6A, the UE 116 derives (at block 622) an operational constraint of the UE based on the UE status 610. At block 620b within block 502, the UE 116 determines the UE-preferred configuration based on a state 624 of the operational constraint of the UE. The state 624 of a UE operational constraint is intermediate information. In a particular example, the UE operational constraint is the battery power level of the UE 116. If the battery level is low (e.g., lower than 20%), then the UE could adjust its tradeoff to prioritize power saving while allowing more tolerance on latency.

Referring to a third embodiment in FIG. 6C, in addition to the embodiment shown in FIG. 6B, the service type detector 612 performs service type detection (i.e., determines the detected service type 616) based on the network status 608. The network status 608 can provide additional information regarding the wireless link, which could help in providing accurate service type detection. At block 620c, the UE 116 determines the UE-preferred configuration based on the detected service type 616, which is derived in part from the network status 608. In certain embodiments, the UE 116 includes a UE configuration determiner, which is represented by blocks 620a, 620b, and 620c.

In a fourth embodiment (not shown), in addition to the embodiment shown in FIG. 6C, the service type detector 612 determines the detected service type 616 based on the UE status 610. That is, the service type detector 612 can determine the detected service type 616 based on the IP traffic history 606, network status 608, and the UE status 610, collectively. The UE 116 determines the UE-preferred configuration based on the detected service type 616, which is derived in part from the UE status 610.

Referring to FIGS. 6A-6C, the structures of the first through fourth embodiments have common components, the functionalities of which will be described as follows. The UE side information 504 may correspond to downlink, uplink or both downlink and uplink. The three sources 606, 608, 610 of UE side information 504 may be obtained by calling an appropriate information fetching function provided by the operating system 361 of the UE. For example, the IP traffic history 606 and UE status 610 are readily available via the various services in the operating system 361 of the UE 116. The network status 608 can be obtained via the RF transceiver 310 or a communication module that provides an interface with the operating system 361 of the UE.

IP traffic history 606 includes inter-packet duration, packet size, number of packets, source/destination address, etc. IP traffic history 606 can be a set of features related to the IP traffic flow, including but not limited to downlink (DL) and uplink (UL) packet size (e.g., maximum size, minimum size, average size), DL and UL packet count (within a time interval of length, e.g., 1-5 seconds), DL and UL packet inter-arrival time.

The network status 608 includes information about the gNB in a cellular network, channel quality metrics, etc. The UE status 610 includes the battery power level, user preferences, sensor data or its derivative, etc. The network status 608 may include link quality metric that could be used to estimate the capacity of the link. Examples of the link quality metric include: the link SNR/SINR/RSRP, the channel rank indicator (such as the rank of the MIMO channel), and the channel speed. The channel speed can be caused by UE mobility or the surrounding objects, which may be obtained by estimating the Doppler shift in the channel and/or using an inertial measurement unit (IMU) sensor data on the UE.

The service type detector 612 determines intermediate information such as the application specifications. The service type detector 612 enables the UE 116 to detect the application specifications by the data traffic pattern derived from the IP traffic history 606. In other words, by performing the service type detection, the UE 116 is able to recognize the IP traffic patterns. Examples of application specifications include an application category and a service type of the applications 362. The service type detector 612 detects a service type 616 of the application(s) 362 running on the UE 116 based on the IP traffic history 606. In this disclosure, it is understood that the intermediate information output from the service type detector 612 includes not only the detected service type of the application, but also includes the application specifications/requirements (e.g., throughput and latency) that correspond to the detected service type.

Service types could be defined differently according to the needs of the algorithm for determining the UE-preferred configuration. In one embodiment, two categories of service types may be defined, such as real time applications and non-real time applications. For example, YOUTUBE video streaming application is categorized as a non-real time application that enables the UE 116 to buffer video content and playback from the buffer. A video conference call is categorized as a real time application that does not provide buffering, but instead enables the UE 116 to adjust configurations between low-resolution and high-resolution display. In another embodiment, service types may be defined based on the functionality of the applications of interest. Some examples of functionality of the applications include video call, voice call, online gaming, and file download. For example, a voice call functionality may be categorized as latency sensitive and may specify a strict latency limitation in the range of tens of milliseconds. A web browsing functionality is categorized as not latency sensitive and may specify a tolerant latency limitation in the hundreds of milliseconds. The file download functionality may be categorized as non-real time. In all these cases, each service type has a set of specifications (e.g., parameters or requirements for operating) in terms of the required throughput, latency, delay bound, jitter, reliability, and other QoS/QoE metrics associated with the service type.

As a non-limiting example, the application currently executing on the UE 116 specifies a data rate (herein referred to as an "application-specified throughput" that is abbreviated as $Tput_{App}$) at which the UE 116 is able to provide a first quality of user experience to the user of the application. For example, in order to provide full high definition (FHD) at 1080p resolution video to the user of a video call application, which is considered as operating at a "Normal" service type, the video call application may specify 3 megabits per second (Mbps) as the application-specified throughput necessary for a clear, uninterrupted video. The user of the video call application may have a "good" user experience when the FHD is provided but may have a "tolerable" user experience when a 280p resolution video is provided to the user. The video call application is able to operate at another service type, referred to as a second service type, at which the application specifies a reduced throughput ($Tput_{App-reduced}$). In order to provide a video call at 280p, which is considered as operating at a "Low" or "Power-saving" service type, the video call application may specify 1.5 Mbps as the application-specified throughput for a stable, buffer-free video. The goal of the "Low" service type is to continue executing the application (e.g., or providing the service) with an acceptable level of degradation of quality of user experience. This "Low" service type could be an acceptable tradeoff, when the UE power should be conserved to provide the service longer, versus supporting the higher quality of user experience but with short service time due to battery power limitation. The memory 360 of UE 116 stores a relationship in which each application-specified throughput (as specified by a particular one of the applications 362) is linked to a respective service type and to a respective quality of user experience. Table 1 below provides an example of such relationships. In Table 1, the first quality of user experience corresponds to a first service type, such that the first service type demands a throughput that is equal to or greater than the application-specified throughput ($Tput_{App}$) in order for the video call application to provide the first quality of user experience to the user. The second quality of user experience corresponds to a second service type, such that the second service type demands a reduced throughput that is equal to or greater than the reduced application-specified throughput ($Tput_{App-reduced}$) in order for the video call application to provide the second quality of user experience to the user.

TABLE 1

Service Types, Application-specified throughput, and Quality of User Experience

| Application Category/ Functionality | Application-specified Parameter/ Requirement | Service Type | Quality of User Experience |
|---|---|---|---|
| Video Call App. | $Tput_{App}$ = 3 Mbps | $1^{st}$ is "Normal" | 1080 p resolution is "Good" |
| Video Call App. | $Tput_{App}$ = 1.5 Mbps | $2^{nd}$ is "Low" or "Power-Saving" | 280 p is "Tolerable" |

In certain embodiments, the service type detector 612 may be implemented using machine learning (ML)-based technology, for example, using a supervised learning framework. Specifically, once the service types of interest have been identified, traffic history is collected by running those services. These traffic histories would serve as the training set for obtaining the service type detector ML-based solution. First, a set of features are extracted from the traffic history within a time duration window (e.g., for a duration of 1-5 seconds), where those extracted features may include the DL and/or UL information such as the maximum, minimum, average packet size, packet count, packets intervals etc. The service type that was running while the traffic was collected is the correct label for the extracted set of features. Using this dataset, a ML model can be trained to classify the service type given the traffic history. By running a sliding window to obtain the features for the classifier, several consecutive prediction results (i.e., coming from adjacent windows that may contain some overlap) may be combined by majority voting (or some other low-pass filtering methods) to improve robustness of the final prediction result. Finally, in addition to the features extracted from the traffic history, the service type detector 612 may also use additional features extracted from the network status 608 and/or UE status 610, may be appended to the input feature.

The throughput estimator 614 determines intermediate information such as a supportable throughput 618 that could be provided to the UE 116 by the network via the cellular link, based on the network status 608 and the UE status 610. In certain embodiments, the estimated supportable throughput may not be the actual throughput value of the UE's link, but rather the capacity of the link. In certain embodiments, the estimated supportable throughput represents an estimate of the throughput that the UE 116 can support, as measured in bandwidth or bits per second of communications link or of a network access. In certain embodiments. the estimated supportable throughput represents a maximum throughput of the UE 116.

The throughput estimator 614 may implement formula-based algorithm. For example, the formula-based algorithm may incorporate the Shannon capacity formula to translate the network and UE information into an estimate of an upper bound on the throughput of the current link. For example, the following Equation 1 may be used to calculate the supportable throughput 618. Note that the bandwidth of Equation 1 may be obtained from the maximum number of component carriers (CCs) supportable, and the number of resource blocks that could be allocated to the UE. Equation 1 provides single-input single-output-based formula. The rank indicator represents an approximate number of data streams supportable. max Tput=(rank indicator)×(bandwidth)×$\log_2$(1+SINR) Equation 1

Other variations may include using a channel matrix for estimating the MIMO channel throughput by the following Equation 2, where det denotes the matrix determinant operator, I denotes the identity matrix, $\sigma_n^2$ is the noise power, H is the MIMO channel matrix, and $\Gamma$ denotes a diagonal matrix that defines the power allocation to each data/spatial stream.

$$\max Tput = (\text{bandwidth}) \times \log_2 \det\left(I + \frac{1}{\sigma_n^2}H\Gamma H^*\right) \quad \text{Equation 2}$$

Other variations for determining the supportable throughput 618, such as when including the precoding scheme may also be used. In addition to the formula-based algorithms of Equations 1 and 2, the allowable modulation and coding scheme (MCS) quantization may be applied, for example, by clipping the values predicted from the formula to the closest MCS. Note that the UE status 610 can provide additional constraints for determining the bandwidth and the power allocation. That is, without knowing the UE status 610, the maximum bandwidth supportable 618 by the network may be used. Depending on the situation (e.g., overheating), the UE 116 may only support a small number of carrier component (e.g., 2) or may not even support carrier aggregation altogether. The UE power status may also limit the maximum power that could be used for power allocation, and thus such consideration may also be included. In the embodiments that include block 622 in which the state of a UE status constraint is determined, the estimate of the max throughput 618 could likely be more accurate.

At the throughput estimator 614, the UE status 610 is also important. The UE status 610 may include the UE battery power level, the temperature of a chip, or the temperature of a certain component. If the chip temperature is high, then even if the wireless channel is in good condition, the uplink throughput 618 would likely still be limited due to the power backoff needed to avoid overheating. The downlink throughput 618 can also be limited if bandwidth reduction is needed to avoid overheating.

Referring FIGS. 6B and 6C, the state 624 of the UE operational constraint derived from the UE status 610 may also be used in blocks 620b or 620c for determining the UE configuration. Such a constraint on the UE operation could be used by the UE configuration determiner 620b or 620c to resolve a good tradeoff between both the application-specified parameters (e.g., requirements of the application 362) and the UE operational constraints. A good tradeoff avoids a dissatisfying quality of user experience.

As a more specific example, the state 624 of the battery power level is used as the UE operational constraint in determining the UE-preferred configuration. If the battery level is low (e.g., lower than 20% battery power threshold), then the UE configuration determiner 620b or 620c could increase the weights to the UE power saving benefit compared to the weight given to the latency. In another implementation, a weight function on the power saving benefit could be defined as a function of the current battery power level, where the function is monotonically decreasing with the battery power level (i.e., lowest weight when battery power is 100%, and the weight increases as the battery power level goes down). As another example, whether the UE is in power saving mode could be used as the state of the UE operational constraint, instead of the battery power threshold.

Referring to FIG. 6C, the service type detector 612 determines the detected service type 616 based on the network status 608. The service type detector 612 extracts several key parameters of the network that could have significant effect on the wireless link, and thus could influence the IP traffic patterns. Examples of such key parameters of the network include the operating frequency band(s), whether carrier aggregation (CA) is enabled, and SNR. For example, the SNR parameter of the network can be used for determining if UE is under an edge, mid, or cell-center condition relative to the coverage area 120. The edge, mid, or cell-center condition of the UE 116 on the wireless link can be used by the service type detector 612 to more easily distinguish between service types, and thus improve the accuracy of service type detector 612.

Referring back to the fourth embodiment, the service type detector 612 utilizes the UE status 610 to determine the detected service type 616, but also analyzes the UE status 610 information based on contextual information (e.g., date, time, location, or environmental levels of sound or illumination). The UE status 610 indicates how the user is interacting with the UE 116 and provides clues as to which of the applications 362 is currently running. As an example of clues, if the currently executing application 362 or service is a video call, then as a clue, the UE status 610 will likely indicate that the screen is ON, but the UE status 610 will likely indicate that the screen is OFF while a voice call is currently executing on the UE. As another example of clues, frequent input from the user (e.g., the input device may be a touch screen or keyboard or the like) will appear in the UE status 610 when an online gaming application is currently executing. This kind of context information obtained from the UE status 610 (which may include the various status of the input and output components) could be used to further strengthen the robustness and accuracy of the service type detector 612.

Although FIGS. 6A-6C illustrate examples of determining intermediate information and a UE-preferred configuration, various changes may be made to FIGS. 6A-6C. For example, various components in FIGS. 6A-6C could be combined, further subdivided, or omitted and additional components could be added according to particular needs.

FIGS. 7-10 show various embodiments relating to when to enable UE power saving features in Release 16. Each of FIGS. 7-10 provide a respective embodiment in which a determination of when to enable or disable utilization of a power-saving UE configuration is based on throughput (Tput), UE operational constraint, latency requirement, or information corresponding to a wireless link, respectively. To avoid duplicative descriptions, some of the features (e.g., blocks 502 and 504, service type detector 612, throughput estimator 614, detected service type 616, and estimated supportable throughput 618) of the method 604 of FIG. 6C are also included in the block diagram of FIGS. 7-10.

Figure 7:
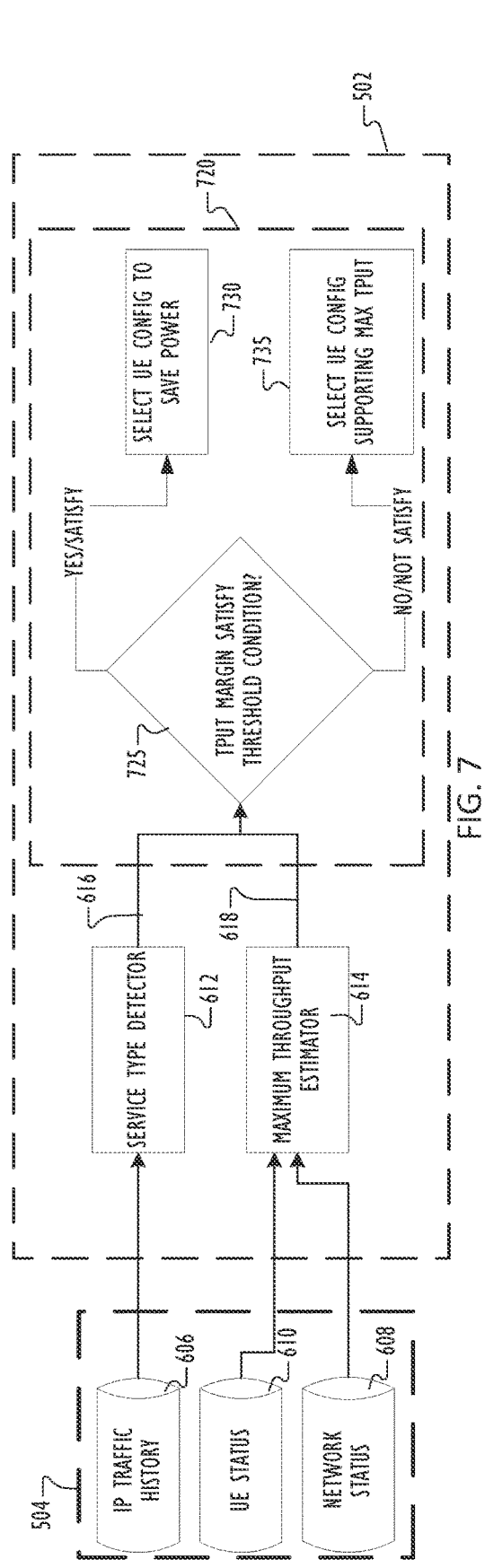
FIG. 7 illustrates a flowchart of a selection to enable or disable power-saving UE configuration based on prioritizing application-specified requirements in accordance with embodiments of this disclosure.

FIG. 7 illustrates a flowchart of a selection to enable or disable power-saving UE configuration based on prioritizing application-specified requirements (e.g., throughput parameter) in accordance with embodiments of this disclosure. The embodiment of the selection 700 shown in FIG. 7 is for illustration only, and other embodiments could be used without departing from the scope of this disclosure.

After the service type detector 612 has determined the detected service type 616 and corresponding application-specified throughput ($Tput_{App}$) required by the application, the UE configuration determiner 720 compares the corresponding application-specified throughput ($Tput_{App}$) to the estimated supportable throughput 618. If the estimated supportable throughput 618 is greater than the corresponding application-specified throughput ($Tput_{App}$) by some margin (denoted by "Threshold" in FIG. 7, where Threshold>0), then the current wireless link has ample quality to meet the requirements of the application/service 362 currently executing on the UE. In such case, there are opportunities to reduce UE power consumption.

The UE configuration determiner 720 determines whether to enable or disable the power-saving UE configuration based on the supportable throughput 618 of the current wireless link. In the embodiment shown, satisfying the application-specified requirements (i.e., in throughput) is prioritized more than power saving. The UE 116 will enable the power-saving UE configuration if a threshold condition is satisfied, meaning the supportable throughput 618 (Max Tput) is more than enough or is equal to the application-specified throughput ($Tput_{App}$). Equation 3 defines the threshold condition for enabling the power-saving UE configuration, wherein the Threshold is greater than or equal to zero. At block 725, the UE utilizes Equation 3 to determine whether a margin (for example, Max $Tput-Tput_{App}$) between the application-specified throughput ($Tput_{App}$) and the supportable throughput 618 is greater than or equal to the Threshold such that the margin satisfies threshold condition.

$$(\text{Max Tput}-Tput_{App}) \geq \text{Threshold} \qquad (3)$$

At block 730, in response to a determination that the threshold condition is satisfied, the UE configuration determiner 720 selects and enables the power-saving UE configuration as the UE-preferred configuration. Note that enabling the power-saving UE configuration does not require that user experience will suffer or diminish, especially in cases where the user has selected a video resolution that is less than the maximum capabilities of the application 362 or where the application is a non-real time application.

At block 735, in response to a determination that the threshold condition is not satisfied, the UE configuration determiner 720 disables the power-saving UE configuration and selects a UE configuration supporting the supportable throughput 618 as the UE-preferred configuration. That is, if the threshold is not satisfied, then likely the current wireless communication link cannot meet the application/service requirements, and any additional configuration targeting UE power saving would worsen the shortcomings of the current wireless communication link. In such a situation, the UE selects the configuration that favors achieving higher throughput. For example, the UE may select the maximum possible bandwidth part as well as maximum possible number of MIMO layers. UE may allow carrier aggregation with the highest number of component carriers. The UE may also disable any DRX setting, and/or scheduling offset, and/or cross slot scheduling if such configuration is active.

Figure 8:
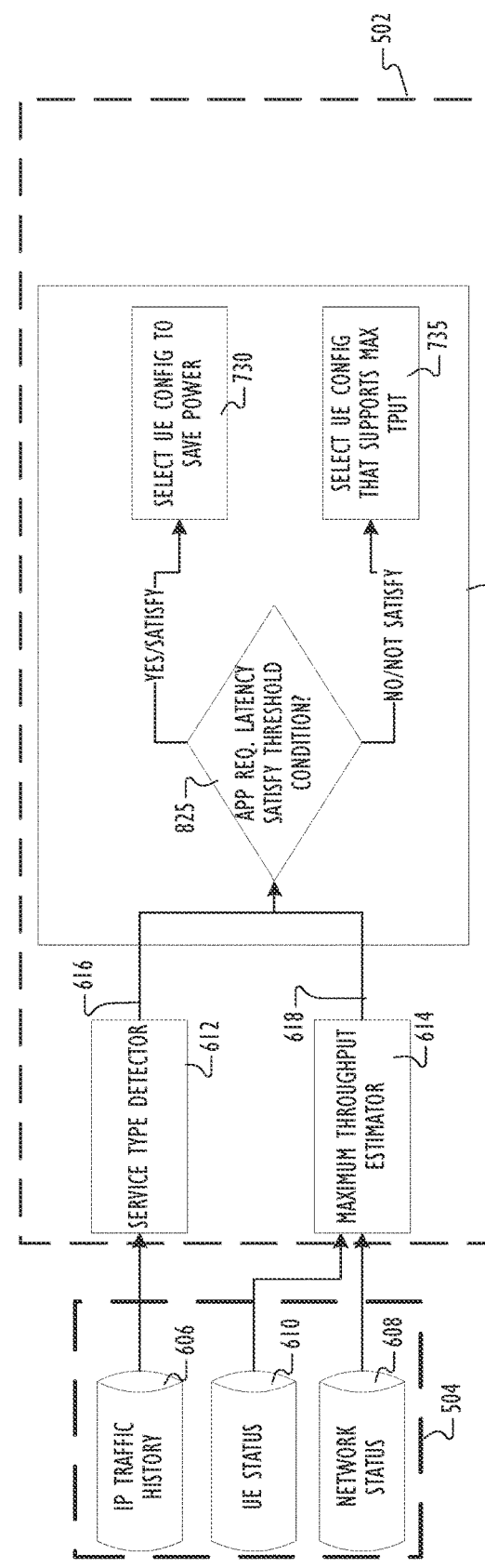
FIG. 8 illustrates a flowchart of a selection to enable or disable power-saving UE configuration based on prioritizing application-specified latency parameter in accordance with embodiments of this disclosure.
Figure 9:
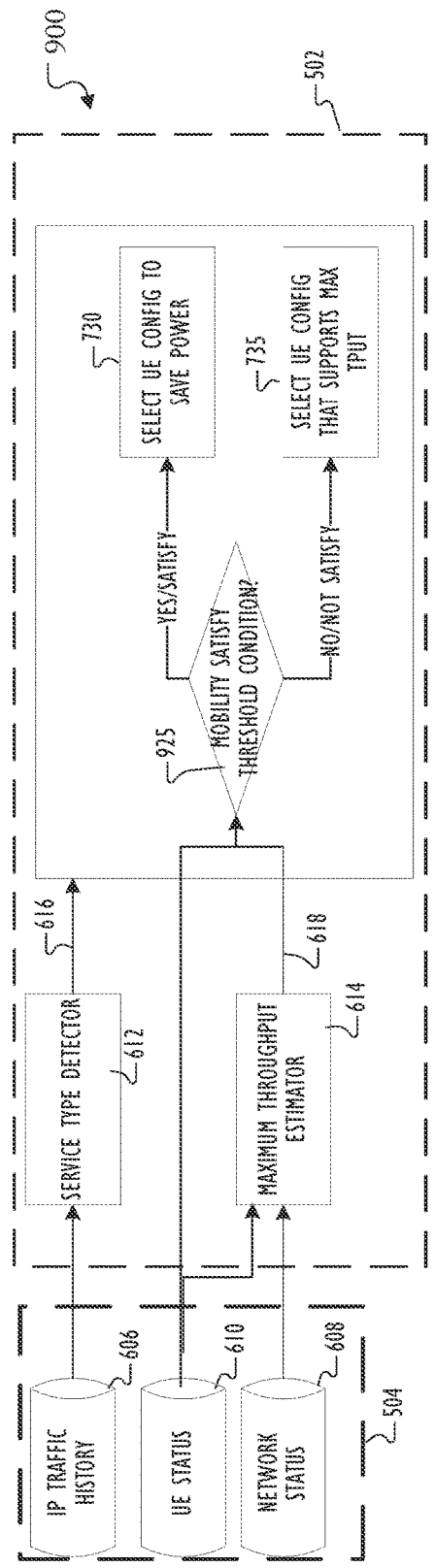
FIG. 9 illustrates a flowchart of a selection to enable or disable power-saving UE configuration based on a limit on wireless channel temporal variation in accordance with embodiments of this disclosure.

Although FIG. 7 illustrates one example UE configuration selector 720 that selects to enable or disable power-saving UE configuration based on prioritizing application-specified requirements, various changes may be made to FIG. 7. For example, various components in FIG. 7 could be combined, further subdivided, or omitted and additional components could be added according to particular needs. As a similar example and to avoid duplication of description, prioritizing application-specified requirements can mean prioritizing the application-specified latency limit (App. Req. Latency), as shown in FIG. 8. As another similar example, prioritizing application-specified requirements can mean prioritizing a limit on wireless channel temporal variation (represented by a mobility threshold), as shown in FIG. 9. The description of FIGS. 8 and 9 will focus on differences from FIG. 7 because FIGS. 7-9 share several components and functions.

FIG. 8 illustrates a flowchart of a selection to enable or disable power-saving UE configuration based on prioritizing application-specified latency parameter in accordance with embodiments of this disclosure. Block 825 in the UE configuration determiner 820 as shown in FIG. 8 is similar to the block 725 in UE configuration determiner 720 of FIG. 7. In this embodiment, the required latency of the application is compared against a latency threshold. At block 825, Equation 4 (below) defines the threshold condition for disabling the power-saving UE configuration, which is opposite to the enabling effect of Equation 3. The threshold condition is satisfied if the application-specified latency limit is not less than (such as, equal to or greater than) the latency threshold. When the latency-related threshold condition is satisfied, then the UE is not latency sensitive and there is still room for UE to select (at block 730) a power-saving UE configuration while not causing any degradation to the user experience (e.g., due to lags caused by the increase in latency). On the other hand, the threshold condition is not satisfied if the application-specified latency is below the latency threshold, in which case the UE selects (at block 735) a UE configuration supporting the supportable throughput 618 as the UE-preferred configuration in order to continue serving the application that is deemed latency sensitive, and any attempt to save UE power likely would sacrifice the user experience too much. Some examples of latency sensitive applications are real-time applications such as cloud gaming applications that require instant interactions between the user, remote servers, and remote users (e.g., other players).

$$\text{App. Req. Latency} \geq \text{Latency Threshold} \qquad (4)$$

FIG. 9 illustrates a flowchart of a selection 900 to enable or disable power-saving UE configuration based on a limit on wireless channel temporal variation in accordance with embodiments of this disclosure. The embodiment of the selection 900 shown in FIG. 9 is for illustration only, and other embodiments could be used without departing from the scope of this disclosure.

The UE configuration determiner 920 receives a mobility level (e.g., based on motion data) of the UE 116 from the UE status 610, and uses the received mobility level to determine whether to enable a power-saving UE configuration. The UE mobility level can be inferred from sensor data received from motion sensors such as IMU, gyro sensor, accelerometer etc. If the UE is moving rapidly, such as in a commuter train or on the body of a user who is running a long distance, then a measurement of the channel quality taken at one geographical location may only be accurate for a short period of time because the UE rapidly moves to another geographical location where the channel quality or link itself is significantly different, thus another measurement of the channel quality needs to be taken.

At block 925, the UE configuration determiner 920 determines whether the received mobility level of the UE satisfies a mobility threshold condition, which is represented by Equation 5 below. In Equation 5, the mobility threshold condition is satisfied if the mobility level of the UE is less than a mobility threshold, wherein the mobility threshold represents a limit on wireless channel temporal variation. The mobility threshold can be specified by an application 362 or by the operating system 361, or by the RF transceiver 310. If the mobility condition is satisfied, the UE mobility level is not "high," and the UE configuration determiner 920 is enabled to select (at block 730) a power-saving UE configuration. If the mobility threshold condition is not satisfied, the UE mobility level is considered as "high," and the UE configuration determiner 920 selects (at block 735) a UE configuration supporting the supportable throughput 618 as the UE-preferred configuration. If the UE is determined to be in a high mobility state, the wireless channel can be expected to change at high speed, and so is the wireless link quality. In such a situation, it is likely difficult to guarantee any service quality or user experience. Therefore, it is better not to enable UE power saving mechanisms when the UE mobility level is high.

$$\text{UE mobility level} < \text{Mobility Threshold} \qquad (5)$$

Figure 10:
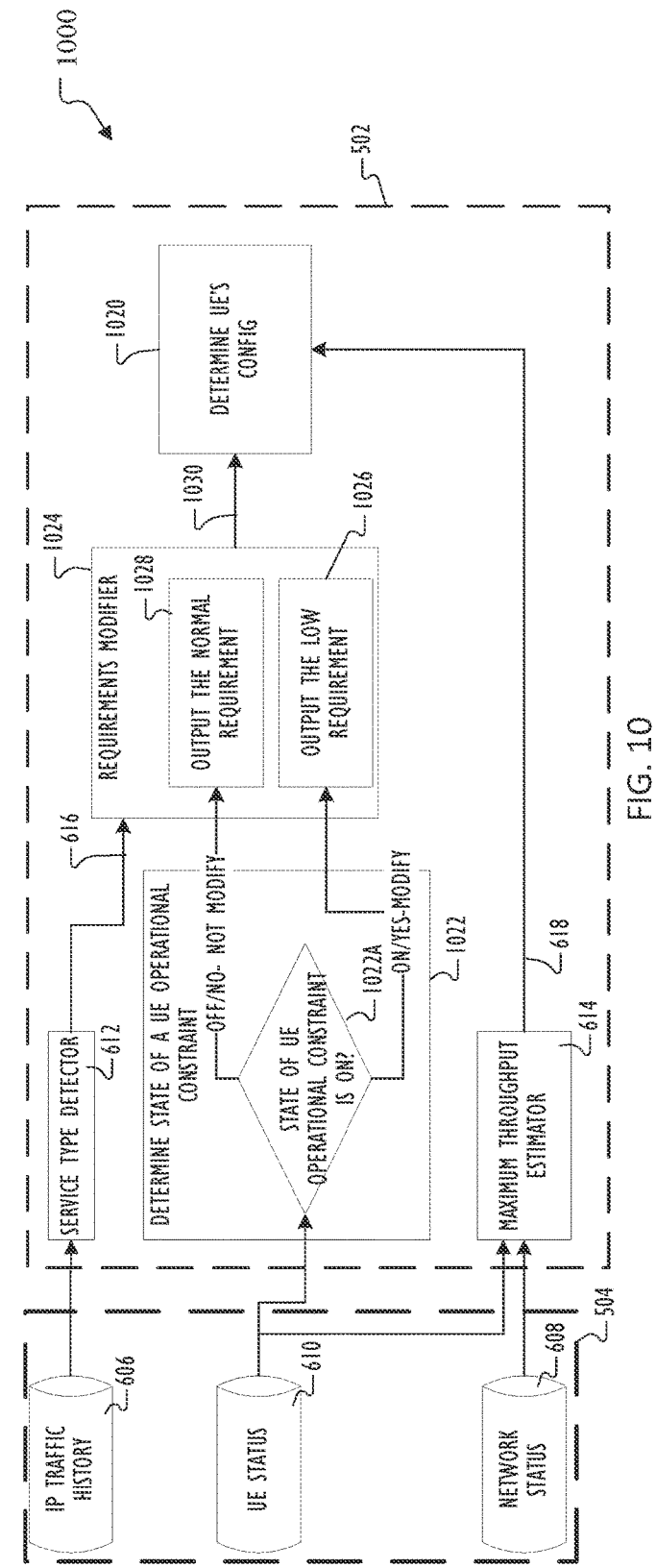
FIG. 10 illustrates a flowchart of determining modify or not modify a selection of a service type based on a state of a UE operational constraint in accordance with embodiments of this disclosure.

FIG. 10 illustrates a flowchart of method 1000 for determining to modify or not modify a detected service type based on a state of a UE operational constraint in accordance with embodiments of this disclosure. The embodiment of the method 1000 shown in FIG. 10 is for illustration only, and other embodiments could be used without departing from the scope of this disclosure.

At block 1022, the UE 116 determines a state an operational constraint of the UE based on the UE status 610. Block 1022 of FIG. 10 is similar to block 622 of FIG. 6. The state of the UE operational constraint could be binary, such as an ON/OFF state. For example, the UE status 610 is used to check if UE 116 has a low battery (e.g., less than 20%). If the battery is low, the low battery operational constraint would be in the ON state, but if the UE 116 does not have a low batter, then the low battery operational constraint would be in the OFF state. Similarly, if the UE 116 is operating in a power-save mode, then the UE operational constraint would be in an ON state. At block 1022a, the UE determines whether the UE operational is in the ON state, and outputs the result to a requirements modifier 1024.

The requirements modifier 1024 determines whether to modify the detected service type 616. For example, in response to an indication that the UE operational is in the ON state, requirements modifier 1024 outputs the "Low" service type 1026 (including the corresponding application-specified parameter/requirement) to the UE configuration determination module 1020. If the unmodified application-specified service type 616 is different from the "Low" service type 1026, then the UE configuration determination module 1020 receives a modified service type (and corresponding parameters). That is, when the detected service type 616 that is input to requirements modifier 1024 differs from the service type that the requirements modifier 1024 selects and outputs, then UE configuration determination module 1020 receives a selected service type 1030 that has been modified compared to detected service type 616. On the other hand, in response to an indication that the UE operational constraint is in the OFF state, the requirements modifier 1024 outputs the "Normal" service type 1028 (including the corresponding application-specified parameter/requirement) to the UE configuration determination module 1020. Then, the throughput requirement corresponding to the selected service type 1030 (either 'normal' or 'low') is used by the UE configuration determination module 1020 in the same manner as similar embodiments illustrated by 620a-c, 720, and 820.

As a practical example, after detecting the detected service type 616, the UE status 610 is used to check (at block 1022) if the UE 116 has a low battery (e.g., less than 20%) or is in power save mode. If YES, then the low parameter/requirement corresponding to the "low" service type 1026 is output to the UE configuration determination module 1020. If NO, then the normal parameter/requirement corresponding to the unmodified selected service type 616 (for example, the "normal" service type 1028) is output to the UE configuration determination module 1020. Then, the throughput requirement from the selected set of requirements (either 'normal' or 'low') is used in the same manner as similar embodiments illustrated by 620a-c, 720, 820, 920.

FIGS. 11-14B show various embodiments relating to operating the UE 116 to save UE power in Release 16. These embodiments include saving UE power by using RRC-inactive mode and DRX parameters.

Figure 11:
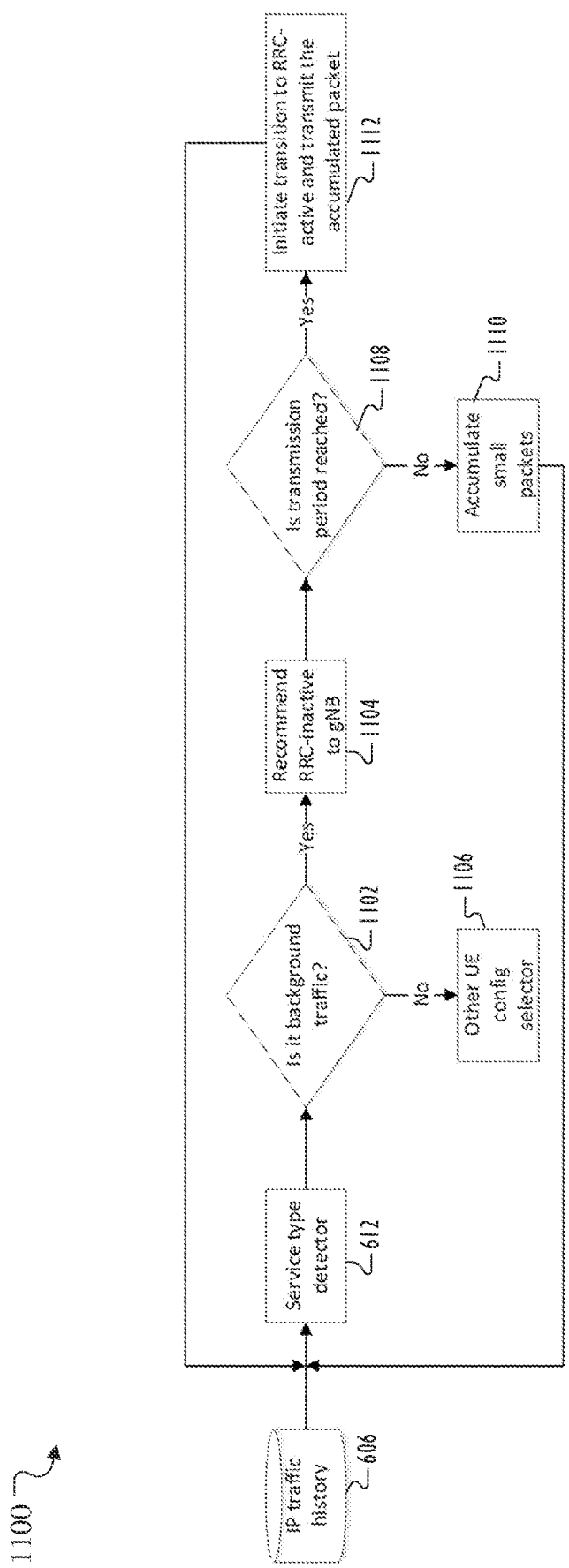
FIG. 11 illustrates a flowchart of a method in which the UE reduces power consumption reduces power consumption by including an RRC-inactive state within the UE-preferred configuration in accordance with embodiments of this disclosure.

FIG. 11 illustrates a flowchart of a method 1100 in which the UE reduces power consumption by including an RRC-inactive state within the UE-preferred configuration in accordance with embodiments of this disclosure. The embodiment of the method 1100 shown in FIG. 11 is for illustration only, and other embodiments could be used without departing from the scope of this disclosure.

In FIG. 11, the UE 116 determines the right time to switch to the RRC inactive state. The RRC-inactive state is a new state defined in the 3GPP standard specification of NR (New Radio). The RRC-inactive state is a state in between RRC-active and RRC-idle state. In RRC-inactive state, both the UE 116 and gNB 102 store the access stratum (AS) context, and the core network connection is also maintained. As a consequence of storing the AS context and maintenance of the core network connection, the RRC inactive state offers a low overhead and latency to transition to RRC active compared to the transition from RRC idle. In future 3GPP releases, this RRC inactive state, or its evolved version (that might take a different name), is expected to be able to support small package transmission as well. In both the present case and the future case, by appropriately switching to the RRC-inactive state (e.g., from the RRC-active state), the UE 116 can save power by avoiding the costly (both in terms of power consumption and latency) transition from RRC-active to RRC-idle state (or in reverse, from RRC-idle state to RRC-active).

In a non-limiting implementation, when the UE 116 has only background traffic with small packet transmission that are not time-sensitive, the UE 116 can use RRC-inactive state to help reduce UE power consumption. Rather than transitioning back to RRC-active state (or remaining in the RRC-active state) whenever the UE 116 has a packet to be transmitted, the embodiments according to this disclosure enable the UE 116 to accumulate those small packets of background traffic and only transmit them over a certain periodicity (at which time the UE transitions to RRC-active state).

At block 1102, the service type detector 612 determines whether a packet to be transmitted by the UE is background traffic, and if YES, then the method 1100 proceeds to block 1104, but if NO, then the method 1100 proceeds to block 1106. For certain types of background traffic, the UE selects to not remain in RRC-active state. The service type detector 612 is trained to identify the background traffic as a service type. The background traffic may include small packets from various applications 362 that are exchanged to get updates from the servers to provide services to those applications 362, and may include some push notifications, etc. In certain embodiments, for the detection of the background traffic, the UE status 610 may also be used, for example, a scenario when the UE's screen is off or locked is more likely for a background traffic.

At block 1104, in response to the service type detector 612 detecting that the currently active service is the background traffic, the UE 116 recommends RRC-inactive state to the gNB 102. This recommendation is based on the facts that a background traffic packet has a small size, and the packet is not time sensitive. On the other hand, at block 1106, another UE configuration selector is utilized to determine the UE-preferred configuration.

At blocks 1108-1112, the UE 116 and the gNB 102 accumulate the small packets and transmit the small packets according to a periodicity (e.g., determined by a "transmission period" as shown in block 1108). The transmission period can be similar to a paging cycle and can have duration on the order of second such as 1.28 sec, 2.56 sec, etc. In certain embodiments, the UE 116 may only transition to the RRC-connected state only once within duration of the transmission period, and the UE 116 recommends RRC-inactive state to gNB 102 upon completion of transmitting those accumulated packets. Note that if a small packet transmission is supportable in RRC-inactive state, then the UE and the gNB can skip the transition to RRC-active state and transmit the small packet as its arrives or with some delay (or some accumulation) as defined in the standard specification.

In block 1108, the UE determines whether the transmission period is reached. For example, the UE wakes up according to the periodicity of switching the antenna 305 between ON/OFF states, in which case the transmission period can be start and end at the ON state and OFF state of the antenna 305, respectively. In block 1110, in response to a determination that the transmission period is not reached (i.e., current time is not during the transmission period), the UE 116 accumulates and does not transmit small packets to be transmitted. In block 1112, in response to a determination that the transmission period is reached, the UE 116 initiates transition to the RRC-active state and transmits the accumulated packets.

Figure 12:
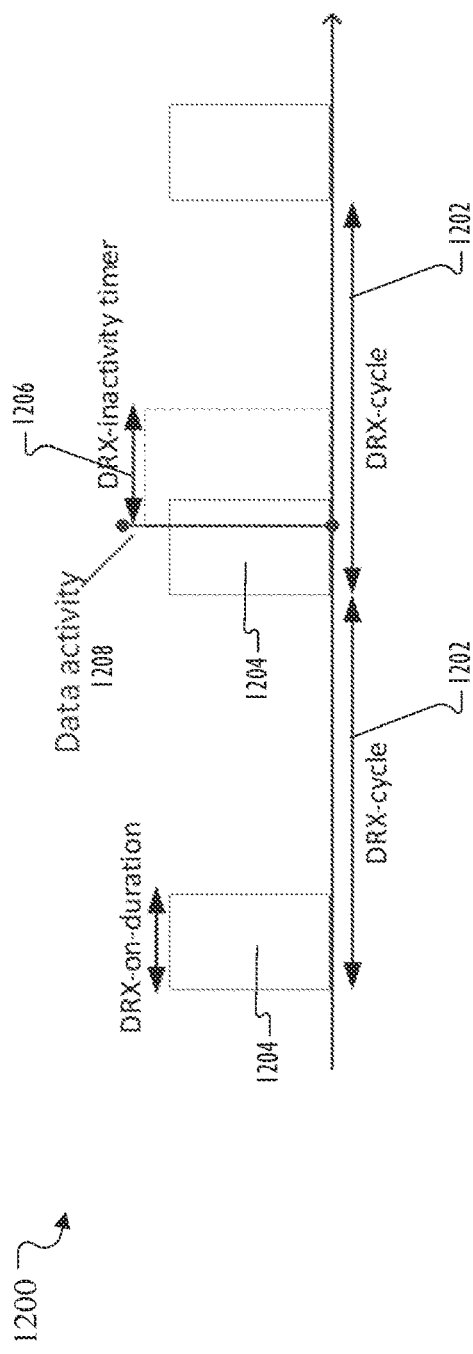
FIG. 12 illustrates a long DRX cycle definition in accordance with embodiments of this disclosure.
Figure 13:
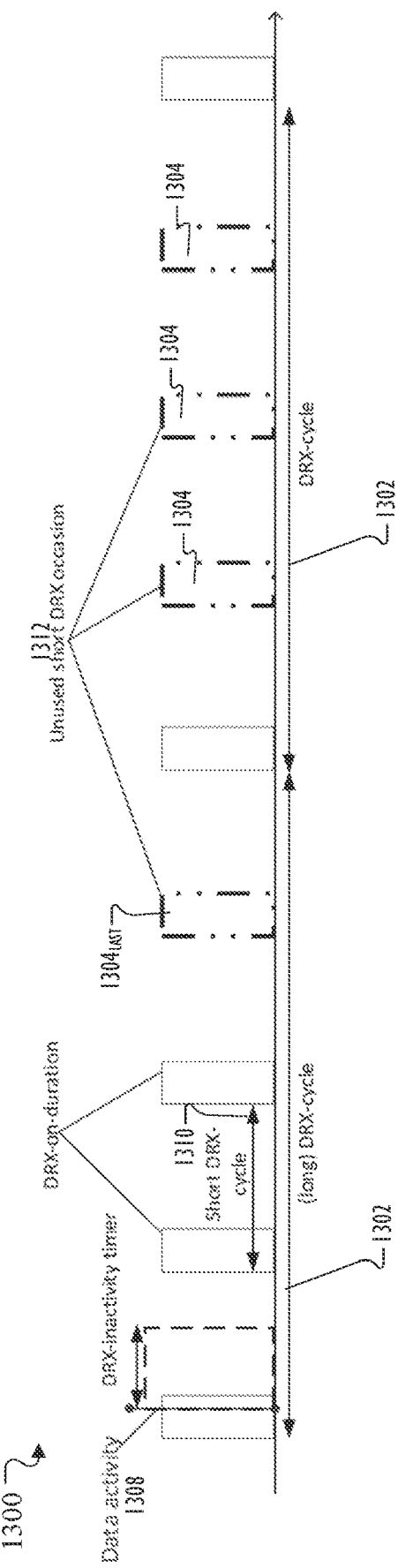
FIG. 13 illustrates a long and short DRX cycle definition in accordance with embodiments of this disclosure.

FIGS. 12 and 13 show two forms of DRX, as defined by 3GPP (including 3GPP NR specifications). FIG. 12 illustrates a long DRX cycle definition 1200 in accordance with embodiments of this disclosure. The long DRX 1200 is mainly defined by three parameters: DRX-long cycle duration 1202, DRX-on-duration 1204, and DRX-inactivity timer 1206. FIG. 13 illustrates a long and short DRX cycle definition 1300 in accordance with embodiments of this disclosure. The long and short DRX cycle definition 1300 is defined by 2 or more parameters: short DRX cycle and short cycle timer. The short DRX cannot standalone and can only be defined in addition to a long DRX cycle definition. The embodiment of the long DRX cycle definition 1200 shown in FIG. 12 and the long and short DRX cycle definition 1300 shown in FIG. 13 are for illustration only, and other embodiments could be used without departing from the scope of this disclosure.

Regarding FIGS. 12 and 13, the UE 116 selects connected-DRX (C-DRX) parameters for UE power saving based on UE side information 504. In this disclosure, "C-DRX" and "DRX" are used interchangeably without any distinction. Discontinuous reception (DRX) is a mechanism that provides a contract between the UE 116 and gNB 102 that allows the UE 116 to periodically switch to sleep mode in order to save power. DRX only requires the UE 116 to stay awake (and monitor for possible transmission) at specific periodicity. DRX may include the long and short DRX cycle 1300 (shown in FIG. 13) with several other parameters (e.g., related to retransmission) for controlling the duration that the UE 116 is awake.

In each DRX-cycle 1202, 1302 1304, the UE 116 is expected to monitor for transmission from the gNB 102 during the DRX-on-duration 1204. If there is no transmission during the DRX-on-duration 1204, the UE 116 transitions to the sleep mode at the end of the DRX-on-duration 1204, and the UE 116 wakes up at the next DRX-on-duration 1204 of the next DRX cycle. The gNB 102 expects the UE 116 to be asleep during the remainder of the DRX-cycle that is not within the DRX-on-duration. If some transmission occurs during the DRX-on-duration 1204, the gNB 102 expects the UE 116 to monitor for transmission for a duration of a DRX-inactivity timer 1206 starting from that data activity point 1208 where the UE receives the transmission. That is, if data activity 1208 occurs during the awake state, then the UE 116 will stay awake longer than the DRX-on-duration 1204.

Now refer to FIG. 13, which illustrates a long and short DRX cycle definition 1300 in accordance with embodiments of this disclosure. The components of 1202-1208 of FIG. 12 are similar to and can be the same as corresponding components 1302-1308 of FIG. 13.

The short DRX cycle 1310 is an optional feature that could be configured in addition to a long DRX cycle 1302. That is, the short DRX cycle 1310 cannot be configured independently. The short DRX cycle 1310 allows flexibility for targeting bursty yet periodic traffic, for example, a transmission in each burst has some periodicity. The short DRX cycle 1310 is defined by two parameters: the DRX-short-cycle 1310 and the DRX-short-cycle-timer 1312. The DRX-short cycle 1310 is the DRX short cycle duration. The DRX-short-cycle-timer 1312 is the integer number of short cycles that the UE should follow after the triggering of a short cycle.

As an example of the operation of these parameters, a (long) DRX cycle duration 1302 is selected as a multiple of the short DRX cycle durations 1310. At the beginning of a long DRX cycle 1302, if there is some transmission data activity 1308, then the short DRX is activated. The short DRX cycle 1310 will be followed for DRX-short-cycle-timer (e.g., this number is set to two in FIG. 13). Since there is no data activity during these two short DRX cycles 1310, the short DRX cycle 1310 is deactivated and the last short DRX occasion 1304$_{last}$ is not used.

In the next long DRX cycle 1302, there is no data activity 1308 at the DRX-on durations 1304 of this long cycle, and thus the short DRX is not activated and all the short DRX occasions in this long DRX cycle are not used. That is, UE 116 does not monitor for data during these short DRX occasions (illustrated as following the previous last short DRX occasion 1304$_{last}$ of the previous long DRX-cycle 1302).

Figure 14A:
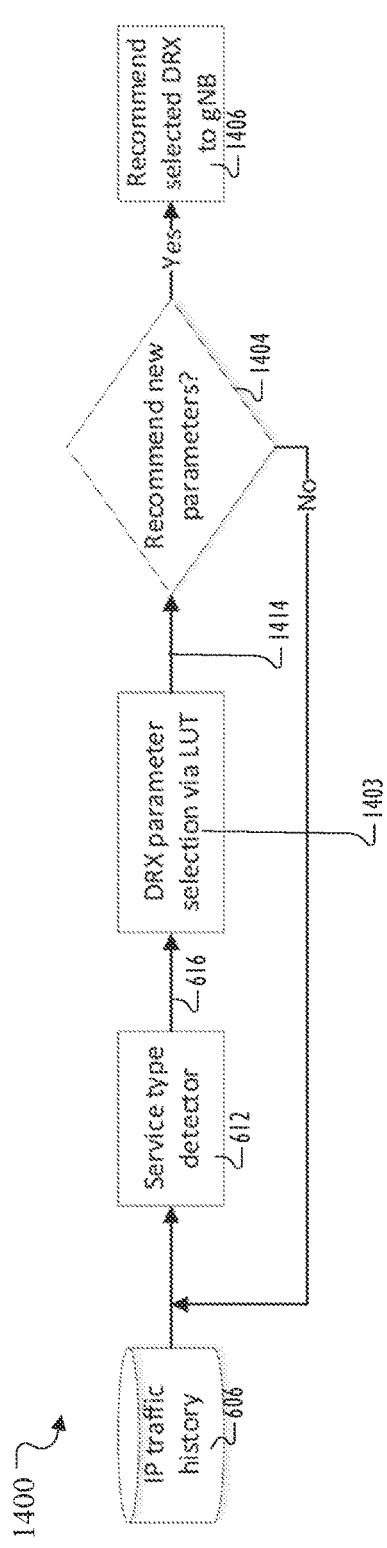
FIG. 14A illustrates a method of DRX parameter selection based on service type in accordance with embodiments of this disclosure.
Figure 14B:
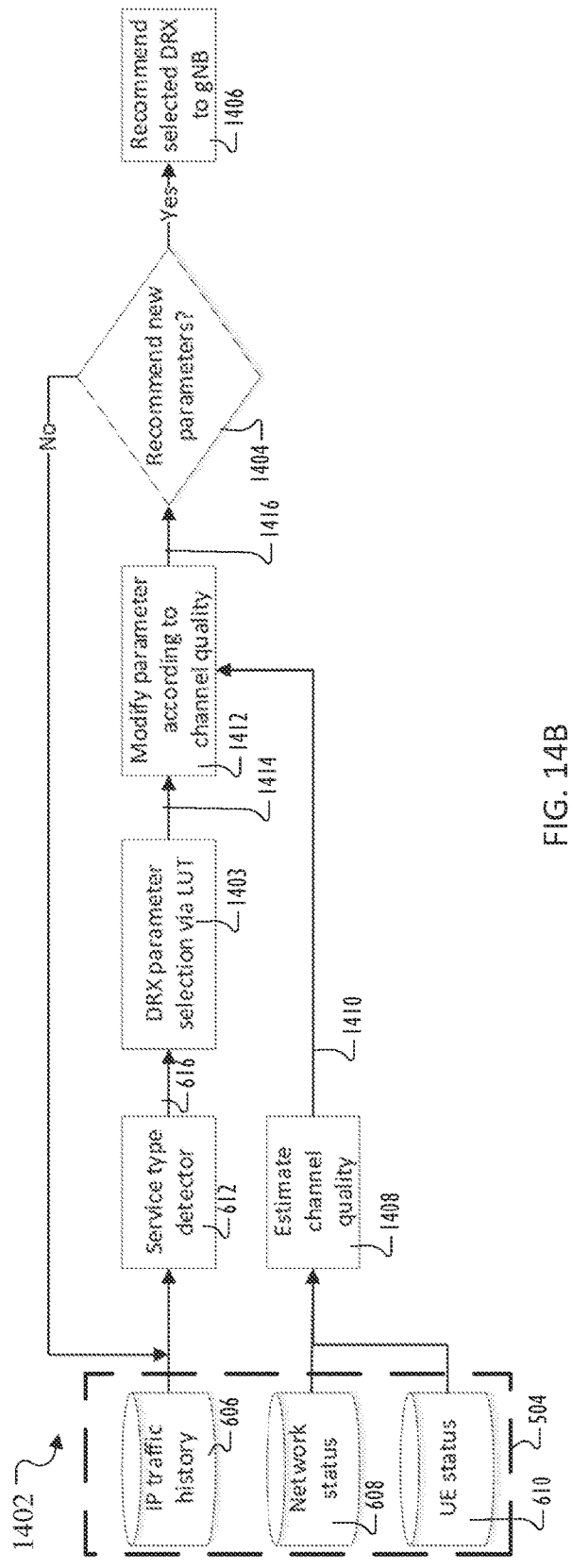
FIG. 14B illustrates a method of DRX parameter selection based on wireless channel quality and service type in accordance with embodiments of this disclosure.

FIGS. 14A and 14B each illustrate a method 1400 and 1402 of DRX parameter selection based on service type in accordance with embodiments of this disclosure. The embodiments of the methods 1400 and 1402 shown in FIGS. 14A-14B are for illustration only, and other embodiments could be used without departing from the scope of this disclosure.

In FIGS. 14A-14B, the methods 1400-1402 optimize the DRX parameter choices for a fixed service type by evaluating the expected power saving for each parameter choice. That is, for each service type, the UE 116 evaluates the expected power saving for each parameter choice. Under the 3GPP standards, the UE 116 is restricted to only report a set of discrete values for the parameters (see 3GPP TS 38.331 V16.5.0 page 306). In embodiments that follow the 3GPP standards, the optimization should be executed on this allowed set of values.

To make the selection of the preferred choice of parameters for each service type, the UE 116 computes the performance of each set of parameter choice in terms of latency and power saving. The extreme number of possible combinations of the allowed parameter values may be prohibitive (such that the UE is unable to compute every possible combination), and instead, the UE 116 performs a search on a subset of the DRX parameters only. In certain use cases, the UE 116 may aim to optimize the long DRX cycle parameter, which may include one or more of three parameters (the cycle duration, the on-duration, and the inactivity timer) because many of the data traffic might not exhibit the pattern that could benefit from having both the long and short DRX cycle configured. In addition, the short DRX cycle parameters (including the short-cycle duration and the short-cycle-timer) can also be optimized.

In certain embodiments, the UE 116 applies a Bayesian optimization solution, which assumes some smoothness in the objective function with respect to the parameters to be optimized. Once such a look-up table (LUT) with recommended set of parameters is obtained, then during the operation, the UE 116 uses the UE side information 504 to detect the service type 616.

In FIG. 14A, adjustment of the long DRX cycle parameter is the target of the method 1400. By performing the method 1400, the UE 116 uses IP traffic history 606 to detect the active service type 616 of the application currently executing on the UE, deduces the data rate and latency required by the application 362, and selects new preferred DRX parameters to be 'just enough' to support the service type 616. By not selecting a too high requirement on the 5G connection, the 'just enough' DRX parameters enable the UE to reduce power consumption.

At block 1403, based on the service type 616 output by the service type detector 612, the UE 116 selects the DRX parameters to be recommended to the gNB 102.

At block 1404 (illustrated as 'Recommend new parameters?'), the UE 116 determines whether to send the new preferred DRX parameters to the gNB 102 as a recommendation, and at block 1406, the UE 116 transmits the recommendation (containing the new preferred DRX parameters) to the gNB 102 based on an affirmative determination at block 1404. To avoid too frequent resetting of the preferred choice of parameters due to the overhead involved in such an operation, the UE 116 may choose to not send the new preferred DRX parameters to the gNB 102, and the method 1400 returns to the service type detector 612. To avoid too frequent resetting of DRX parameters, the UE 116 may employ a prohibit timer that will not allow another parameter recommendation for some time duration after the last recommendation. An example prohibit timer includes the drx-PreferenceProhibitTimer value if configured by the gNB. As another mechanism to avoid too frequent resetting of DRX parameters, the UE 116 can check if the change of DRX parameters is substantial (such as, the power saving metric expected by the look-up table exceeds a threshold for enabling transmission of the new DRX parameters). These two mechanisms, which to avoid too frequent resetting of DRX parameters, could be used in combination.

FIG. 14B illustrates a method 1402 of DRX parameter selection based on wireless channel quality and service type in accordance with embodiments of this disclosure. In the method 1402, the UE 116 adapts the selection of new UE-preferred DRX parameters based on the channel quality of the current wireless link. The more complex method 1402 of FIG. 14B incorporates components and functionality from the simpler method 1400 of FIG. 14A as the starting point and adapts the DRX parameters per the channel quality. As comparison, the method 1400 of FIG. 14A could be applied to a fixed channel quality or a mix of various channel qualities.

For simplicity of the description, the method 1402 will describe a case when the channel quality drops. However, another embodiment of this disclosure the same procedure applies to the case when the channel quality improves. For distinction, two types of channel quality drop will be described. A first type of channel quality drop (Drop Type 1) includes an occurrence in which the channel quality falls to a lower level without too much variation across time (for example, the magnitude or frequency of variations remain below a variation threshold). A second type of channel quality drop (Drop Type 2) includes an occurrence in which the channel quality exhibits large variation over time with the average channel quality becoming worse than before the quality drop.

Here begins a description of addressing Drop Type 1. The data rate supported by the wireless link degrades but with a proper Modulation and Coding Scheme (MCS) selected, the UE 116 can expect few or infrequent packet drops. A lower data rate indicates that the UE 116 should conduct an adjustment to the DRX on-duration 1204, 1304 and the inactivity timer 1206. In one embodiment, in compliance with the UE assistance information feature of Release 16, only the inactivity timer 1206 parameter may be adjusted by using the ratio of the throughput before and after the channel quality drop.

As an example, the network status 608 and the UE status 610 are inputs to a channel quality estimator 1408, which generates a channel quality estimate 1410. At block 1412, the UE 116 modifies the LUT-based selection of DRX parameters 1414 (illustrated in FIGS. 14A and 14B) based on the channel quality estimate 1410. At block 1404, the UE 116 determines whether to send the modified preferred DRX parameters 1416 to the gNB 102 as a recommendation.

In an example implementation of block 1412, a channel quality metric is the maximum supportable throughput 618. The channel strength may be used in a version of the Shannon capacity formula to estimate the maximum throughput supportable, wherein the channel strength includes RSRP (readily available in measurement reports defined in the 3GPP standards) along with UE power headroom and maximum bandwidth (including carrier aggregation if used). In this example, the DRX parameters 1414 to be modified is the inactivity timer 1206. The DRX cycle determines the maximum delay, which could be fixed for a given service type. The maximum delay can represent a period of time that starts when the gNB 102 receives an uplink communication associated with the data activity 1208, 1308 at the end of a DRX-on-duration 1204 (i.e., the UE 116 will be asleep if a downlink response is sent immediately) and that ends at the start of the next DRX-on-duration 1204 of a next DRX-cycle 1202, effectively a DRX cycle 1202 duration. The inactivity timer 1206 may be modified using an adjustment ratio ($\rho_{adj}$) defined by Equation 6, wherein the adjustment ratio may be defined as any function that is monotonically increasing as the channel quality drops.

$$\text{inactivity-timer} = \rho_{adj} \times \text{inactivity-timer} \qquad (6)$$

When channel quality 1410 is estimated in terms of the average throughput, the adjustment ratio may be defined by Equation 7, where the reference average throughput is the average throughput corresponding to the selection from the lookup table. Equation 7 corresponds to the Drop Type 1.

$$\rho_{adj} = \frac{ref avgTput}{current\, avgTput} \qquad \text{Equation 7}$$

In another implementation of block 1412, the inactivity timer 1206 may be additionally modified to account for the increase of the DRX-on-duration 1204. In this case, the DRX-inactivity timer 1206 may be selected as according to Equation 8:

$$\text{inactivity-timer} = \rho_{adj} \times \text{inactivity-timer} + (\rho_{adj} - 1) \times \text{on-duration} \qquad (8)$$

Here begins a description of addressing Drop Type 2. The large variation of channel quality over time indicates that the rate adaptor would likely experience a hard time selecting an appropriate MCS. An inappropriate MSC leads to the potential for frequent packet drops, which would require retransmission. As a general trend and like in the case of Drop Type 1, the average throughput decreases under Drop Type 2. However, in the case of Drop Type 2, the average throughput is harder to achieve when searching for a short duration, such as within a time span of one or several DRX cycles. Thus, in this case of Drop Type 2, compared to the channel quality Drop Type 1, additional margin to on-duration 1204 parameter and inactivity timer 1206 parameter maybe needed. In this case of Drop Type 2, the adjustment ratio may have to also account for the channel quality variation. The adjustment ratio may then be defined as a function of two inputs (i.e., the average channel quality and its variation), where the function could be monotonically increasing as the average channel quality decreases, and where the function could be monotonically increasing as the channel quality variation increases. In the case in which the throughput is the estimated channel quality 1410, then the adjustment ratio ($\rho_{adj}$) may be defined by Equation 9, where $\alpha > 0$ is a parameter that may be tuned accordingly to the channel type, which could be determined from empirical measurements.

$$\rho_{adj} = \frac{ref avgTput}{(current\, avgTput - \alpha \times (std\, of\, Tput))} \qquad \text{Equation 9}$$

Figure 15:
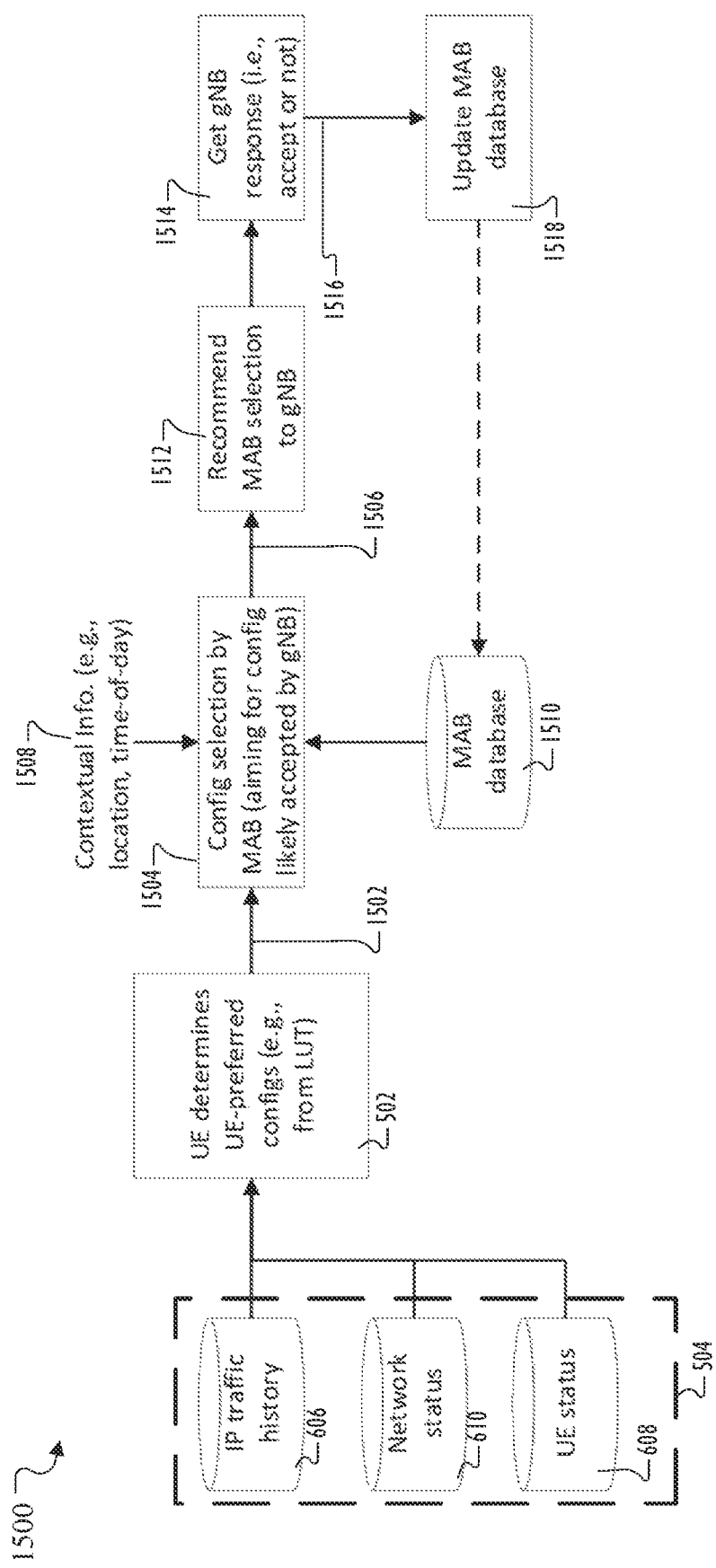
FIG. 15 illustrates a method of adapting the UE-preferred configuration based on a history of accept/reject responses received from the network in accordance with embodiments of this disclosure.

In order to reduce a likelihood that external network device selectively rejects the UE-preferred configuration, FIG. 15 illustrates a method 1500 of adapting the UE-preferred configuration based on a history of accept/reject responses received from the network in accordance with embodiments of this disclosure. The embodiment of the method 1500 shown in FIG. 15 is for illustration only, and other embodiments could be used without departing from the scope of this disclosure.

Release 16 provides UE assistance information 402 as a medium for the UE 116 to convey the UE-preferred configuration to the gNB 102, but the 3GPP standard does not specify how the gNB 102 should respond. There could be various reasons why the gNB might not be able to accept UE-preferred configuration. For example, the gNB 102 may reject the UE-preferred configuration due to: inefficiency for some configuration request, wireless resource-constrained, potentially harmful interference to neighboring cells, etc. In light of this uncertainty regarding a response from the gNB, the UE 116 can execute the method 1500 to maintain as much control over the power-saving UE configuration determination as possible in Release 16, particularly by selecting configurations that are likely be accepted by the gNB. When an optimal choice is likely to be rejected by the gNB, the method 1500 enables the UE to have more control in deciding its preferred tradeoff and not leaving the choice to be made by the gNB.

As described above, at block 502, the UE 116 determines the UE-preferred configuration 1502 (for example, from the LUT) based on UE side information 504. A multi-armed bandit (MAB) 1504 selects a recommendable UE configuration 1506 to be recommended to the gNB 102 based on inputs including: the UE-preferred configuration 1502, contextual information 1508, and MAB information received from an MAB database 1510. At block 1512, the UE 116 transmits the recommendable UE configuration 1506 to the gNB 102. At block 1514, the UE 116 obtains a response 1516 (i.e., acceptance/rejection of the recommendable UE configuration 1506) from the gNB 102. At block 1518, to update the MAB database 1510, the UE 116 provides at least some of the information contained within the received response 1516 and the contextual information 1508 to the MAB database 1510.

To identify situations where gNB might reject UE-preferred configuration, the UE 116 builds contextual MAB database 1510 from which to identify patterns of acceptances and patterns of rejections given selected configuration 1502 and the contextual information 1508. The gNB might reject UE-preferred configuration in situations when the gNB has resource constraints (i.e., when there are congestions in the network such as when there are many users, scheduling flexibility would degrade); and due to some specific behavior of the scheduler (i.e., some dependency on the scheduler's implementation). For some intuition on contextual information 1508, the UE 116 may use the location and time-of-day for a cellular network to correlate with congestion of the wireless network 100. For example, in a business district, lots of data activity occurs during daytime and lunch time, and little data traffic occurs during nighttime. On the contrary, in a residential area, lunch time might have little traffic, while nighttime may have increased data traffic comparatively. The scheduler behavior of the wireless network 100 is defined by the vendor and thus will also be tied to the location. As such, a pair of location and time-of-day information could be a good candidate context information for identifying when the gNB might reject UE's suggested configuration based on network congestion. Other examples for context information may include the radio signal band ID, cell ID, GPS coordinate, etc.

In certain embodiments, the context information 1508 (for example, location, time-of-day) is used in an online learning manner to adapt and improve the UE's power saving feature that selects the UE-preferred configuration so that the UEAssistanceInformation 402 will contain a UE-preferred configuration that is likely to be accepted by the gNB 102. For this type of online learning, the framework of a multi-armed bandit (MAB) 1504 is suitable. In the embodiment shown, contextual MAB is a suitable solution framework by enabling the MAB 1504 to utilize the contextual information 1508.

For this kind of online decision-making problem, tradeoff between exploration and exploitation is needed. While the acceptance of the selected configuration is important, the UE has to also select configurations that can save its power. As such, there is no reason for the UE to determine configurations that are too different from the best configurations (e.g., those precomputed in a LUT). What this means is that the explore-exploit tradeoff that is meaningful would be confined to those points near the optimal set of configurations for the UE. Since the search space is restricted, we can expect MAB to learn faster.

Figure 16A:
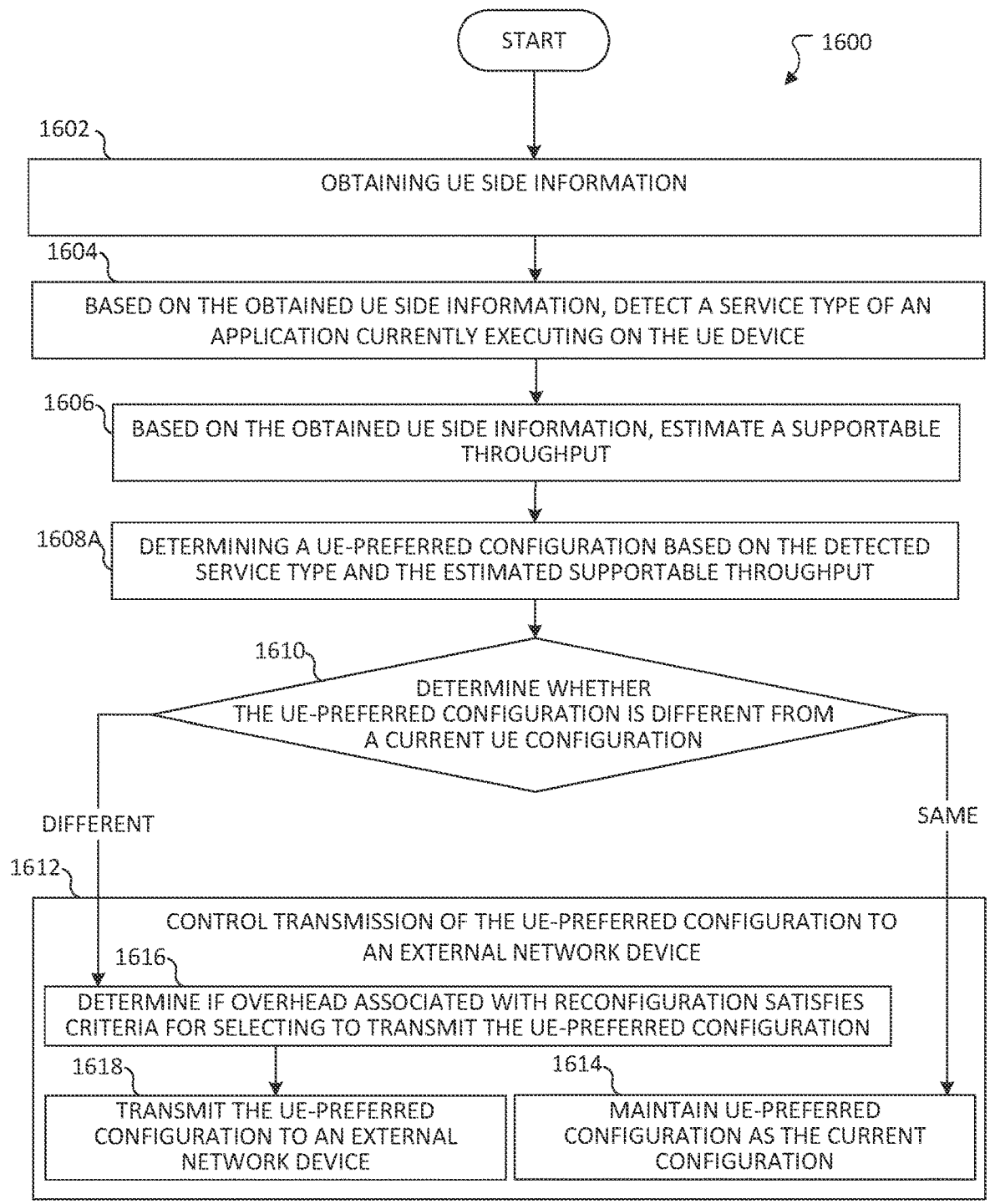
FIG. 16A illustrates a method for UE power saving leveraging side information at the UE in accordance with an embodiment of this disclosure.

FIG. 16A illustrates a method 1600 for UE power saving leveraging side information at the UE in accordance with an embodiment of this disclosure, as may be implemented by an electronic device (e.g., UE 116 of FIG. 3). The embodiment of the method 1600 shown in FIG. 16A is for illustration only, and other embodiments could be used without departing from the scope of this disclosure. One or more of the components illustrated in FIG. 16A can be implemented in specialized circuitry configured to perform the noted functions or one or more of the components can be implemented by one or more processors executing instructions to perform the noted functions.

As illustrated in FIG. 16A, the method 1600 begins at block 1602. At block 1602, the processor 340 obtains UE side information. The UE side information includes internet protocol (IP) traffic history, network status, and UE status.

At block 1604, based on the obtained UE side information, the processor 340 detects a service type of an application (e.g., one or more of the applications 362 of FIG. 3) executing on the UE. In certain embodiments, the detecting of the service type detects a kind or category of application (or possibly applications) executing on the UE. In certain embodiments, the processor 340 determines or estimates which application(s) 362 the UE 116 is executing or which executing application(s) 362 the user of UE 116 has selected for execution. In certain embodiments, the detecting of the service type is based on the IP traffic history.

At block 1606, based on the obtained UE side information, the processor 340 estimates a supportable throughput. In certain embodiments, the estimating of the supportable throughput is based on the network status and the UE status. In certain embodiments, the estimating of the supportable throughput is a maximum supportable throughput ($Tput_{max}$).

Figure 16B:
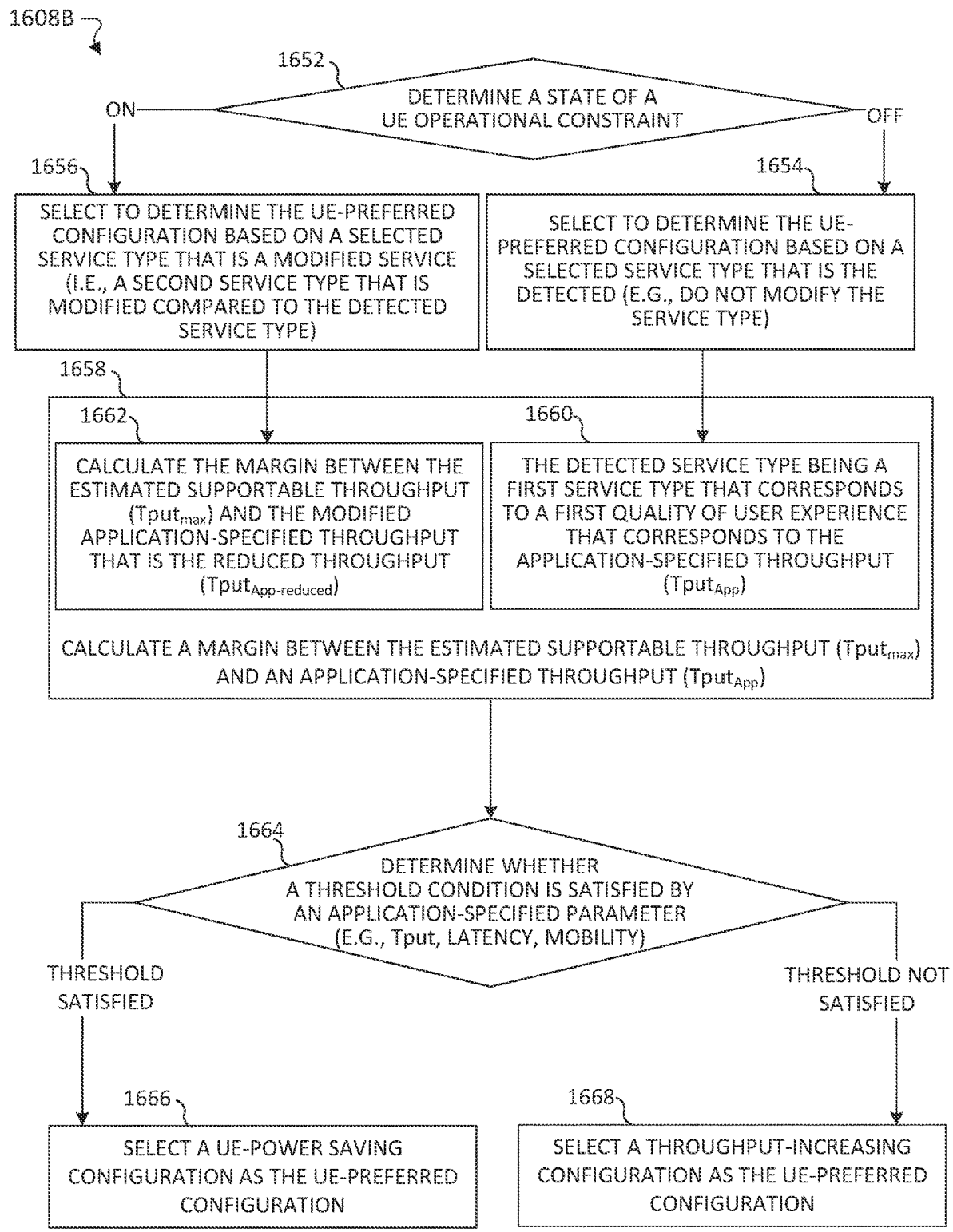
FIG. 16B illustrates a sub-process for determining the UE-preferred configuration, as may be implemented as part of the method of FIG. 16A, in accordance with an embodiment of this disclosure.

At block 1608a, the processor 340 determines a UE-preferred configuration based on the detected service type and the estimated supportable throughput. Additional details of block 1608a are shown in FIG. 16B as a sub-process 1608b for determining the UE-preferred configuration. In certain embodiments, the UE-preferred configuration comprises a recommendation that includes at least one of an RRC-inactive state and a DRX parameter.

At block 1610, the processor 340 determines whether the UE-preferred configuration is different from a current UE configuration.

At block 1612, based on a result of the determination of whether the UE-preferred configuration is different from the current UE configuration, the processor 340 controls transmission of the UE-preferred configuration to an external network device (such as the gNB 102 of FIG. 1). Particularly, based a determination result that the UE-preferred configuration is the same as the current UE configuration, the method 1600 proceeds to block 1614. Alternatively, based a determination result that is that the UE-preferred configuration is different from the current UE configuration, the method 1600 proceeds to block 1616.

At block 1614, to control transmission of the UE-preferred configuration to the external network device, the processor 340 maintains UE-preferred configuration as the current configuration, for example, by not transmitting the UE-preferred configuration that is the same as the current configuration. By not transmitting the UE-preferred configuration to the external device, the UE avoids unnecessary consumption of resources (e.g., CPU usage, electric/battery energy, over-the-air bandwidth) that would be consumed if a transmission were to be performed. However, this disclosure does include embodiments in which the UE 116 transmits the UE-preferred configuration that is the same as the current configuration.

At block 1616, to control transmission of the UE-preferred configuration to the external network device, the processor 340 determines if overhead associated with reconfiguration satisfies criteria for selecting to transmit the UE-preferred configuration. Based on a determination that the criteria for selecting to transmit the UE-preferred configuration is not satisfied by the overhead associated with reconfiguration, the processor 340 does not transmit the UE-preferred configuration to the external network device. By not transmitting the UE-preferred configuration to the external device, the UE avoids unnecessary consumption of resources (e.g., CPU usage, electric/battery energy, over-the-air bandwidth) that would be consumed if a transmission were to be performed. Alternatively, based on a determination that the criteria for selecting to transmit the UE-preferred configuration is satisfied by the overhead associated with reconfiguration, the method 1600 proceeds to block 1618 at which the processor 340 transmits the UE-preferred configuration to the external network device. Block 1616 is optional in certain embodiments, and in such cases, the method 1600 proceeds to block 1618 from block 1610 based on the determination that the UE-preferred configuration is different from the current UE configuration. In certain embodiments, transmitting the UE-preferred configuration to the external network device includes configuring a UE assistance information to include the UE-preferred configuration, and then transmitting the configured UE assistance information to the external network device.

In certain embodiments of block 1612, to control transmission of the UE-preferred configuration to the external network device, the processor 340 generates a prediction of a UE configuration that is likely to be accepted by the external network device. The predicted UE configuration is a result of executing a multi-arm bandit (MAB) reinforcement-learning algorithm on an MAB database, the UE-preferred configuration as determined at block 1608*a* (for example, including the sub-process 1608*b* of FIG. 16B), and at least one of the following: a current location of the UE and a time of day at the UE. In response to determining that the UE-preferred configuration is different from the predicted UE configuration, the processor 340 does not transmit the UE-preferred configuration to the external network device, and instead transmits the UE-preferred configuration to the external network device in response to a determination that the predicted UE configuration is different from the current UE configuration.

FIG. 16B illustrates the sub-process 1608*b* for determining the UE-preferred configuration in accordance with an embodiment of this disclosure, as may be implemented as part of the method 1600 of FIG. 16A.

As illustrated in FIG. 16B, the sub-process 1608*b* begins at block 1652. At block 1652, the processor 340 determines a state of a UE operational constraint. As described above with FIG. 8, determining the UE-preferred configuration includes determining the UE-preferred configuration based on the state of the UE operational constraint. The state of the UE operational constraint is an ON state or an OFF state. The state of the UE operational constraint is determined based on at least some of the UE side information. In the ON state of the UE operational constraint, the UE power saving features may degrade a user experience of the application.

At block 1654, in response to a determination that the state of the UE operational constraint is the OFF state, the processor 340 selects to determine the UE-preferred configuration based on a selected service type that is the detected service type 616 of the application currently executing on the UE 116, which service type was detected at block 1604 of FIG. 16A. Particularly, the selected service type is not modified compared to the detected service type 616. For example, FIG. 10 shows that selected service type 1030 (and corresponding requirements) output by the requirements modifier 1024 is unmodified compared to the detected service type 616. The method proceeds from block 1654 to block 1658, at which the processor 340 calculates a margin between the estimated supportable throughput (as estimated at block 1606 of FIG. 16A) and an application-specified throughput ($Tput_{App}$).

At block 1656, in response to a determination that the state of the UE operational constraint is the ON state, the processor 340 selects to determine the UE-preferred configuration based on a selected service type that is a modified service type. Particularly, the processor 340 selects, as the modified service type, another service type that corresponds to a reduced throughput ($Tput_{App-reduced}$) and that is different from the detected service type 616 currently executing on the UE 116. For example, FIG. 10 shows that selected service type 1030 (and corresponding requirements) output by the requirements modifier 1024 is modified compared to the detected service type 616. In certain embodiments of block 1656, in response to a determination that the state of the UE operational constraint is the ON state, the processor 340 also modifies the application-specified throughput to be the reduced throughput. For example, as the modified application-specified throughput, the processor 340 selects, as the selected service type 1030, a second service type (such as the Power-saving service type) that corresponds to a reduced application-specified throughput ($Tput_{App-reduced}$). The method proceeds from block 1656 to block 1658.

At block 1658, the processor 340 calculates a margin between the estimated supportable throughput ($Tput_{max}$) and an application-specified throughput. Examples of blocks 1658 and 1664 are described above regarding the UE configuration determiner 720 of FIG. 7. The value of the application-specified throughput depends upon whether the selected service type 1030 is unmodified or is modified. In cases in which the selected service type 1030 at block 1654 is unmodified compared to the detected service type 616, the processor 340 calculates (at block 1660) the margin by subtracting the application-specified throughput ($Tput_{App}$) from the estimated supportable throughput ($Tput_{max}$). To calculate the margin in cases in which the selected service type 1030 at block 1656 is modified compared to the detected service type 616, the processor 340 calculates (at block 1662) the margin between the estimated supportable throughput and the modified application-specified throughput that is the reduced throughput by subtracting the modified application-specified throughput ($Tput_{App-reduced}$) from the estimated supportable throughput ($Tput_{max}$).

In certain embodiments, when meeting the unmodified specifications of an application are prioritized more than power saving, the sub-process 108 includes block 1664. At block 1664, the processor 340 compares an application-specified parameter (such as the unmodified application-specified throughput or an application-specified latency limitation) to a threshold condition to determine whether a result of the comparison satisfies threshold.

For example, as described above with FIG. 7, when meeting the unmodified application-specified throughput is prioritized more than power saving, block 1664 is an embodiment in which the processor 340 compares the calculated margin to a threshold to determine whether the margin exceeds or is equal to the threshold. The value of the threshold enables the UE 116 to select a power-saving UE configuration when the estimated supportable throughput is greater than or equal to the unmodified application-specified throughput but prevents the UE 116 from selecting the power-saving UE configuration when the estimated supportable throughput is less than the unmodified application-specified throughput. For example, the threshold can have a zero value or a negligible value that is substantially equivalent to the zero value. In response to a determination that the margin exceeds or is equal to the threshold, the processor 340 determines that the comparison result satisfies the threshold condition, and the sub-process 1608*b* proceeds to block 1666. On the other hand, in response to a determination that the margin does not exceed the threshold, the processor 340 determines that the comparison result does not satisfy the threshold condition, and the sub-process 1608*b* proceeds to block 1668.

As another example, as described above with FIG. 8, when meeting the application-specified latency limitation is prioritized more than power saving, block 1664 is an embodiment in which the processor 340 compares the application-specified latency limitation to a latency threshold to determine whether the application-specified latency limitation is less than the latency threshold. The value of the latency threshold enables the UE 116 to select a power-saving UE configuration when the application-specified latency limitation is less strict and permits a varying degree of increased latency up to the latency threshold but prevents the UE 116 from selecting the power-saving UE configuration when the application-specified latency limitation is more strict or equal to the latency threshold. In response to a determination that the application-specified latency limitation is less than the latency threshold, the processor 340 determines that the comparison result satisfies the threshold condition, and the sub-process 1608b proceeds to block 1666. On the other hand, in response to a determination that the application-specified latency limitation is not less than the latency threshold, the processor 340 determines that the comparison result does not satisfy the threshold condition, and the sub-process 1608b proceeds to block 1668.

As another example, as described above with FIG. 7c, when limiting wireless channel temporal variation is prioritized more than power saving, block 1664 is an embodiment in which the processor 340 compares a measured mobility level of the UE 116 to a mobility threshold. The mobility threshold represents a limit on wireless channel temporal variation that the UE 116 (e.g., operating system 361 of the UE or application 362 currently executing on the UE) permits because the wireless channel temporal variation can be inferred from measured UE mobility. In response to a determination that the measured mobility level of the UE 116 is less than the mobility threshold, the processor 340 determines that the comparison result satisfies the threshold condition, and the sub-process 1608b proceeds to block 1666. On the other hand, in response to a determination that the measured mobility level of the UE 116 is greater than or equal to the mobility threshold, the processor 340 determines that the comparison result does not satisfy the threshold condition, and the sub-process 1608b proceeds to block 1668.

At block 1666, in response to a determination that the application-specified parameter satisfies the threshold condition, the processor 340 selects a UE-power saving configuration as the UE-preferred configuration. The method 1600 proceeds from block 1666 to block 1610 of FIG. 16A.

At block 1668, in response to a determination that the application-specified parameter does not satisfy the threshold condition, the processor 340 selects a throughput-increasing configuration as the UE-preferred configuration. The method 1600 proceeds from block 1668 to block 1610 of FIG. 16A.

Although FIGS. 16A-16B illustrates an example method 1600 for UE power saving leveraging side information at the UE, various changes may be made to FIGS. 16A-16B. For example, while shown as a series of steps, various steps in FIGS. 16A-16B could overlap, occur in parallel, occur in a different order, or occur any number of times. Particularly, blocks 1604 and 1606 can occur in parallel.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE), the method comprising:
   obtaining UE side information;
   based on the obtained UE side information, detecting a service type of an application executing on the UE and estimating a supportable throughput;
   determining a UE-preferred configuration based on the detected service type and the estimated supportable throughput;
   determining whether the UE-preferred configuration is different from a current UE configuration;
   controlling transmission of the UE-preferred configuration to an external network device, based on a result of the determination of whether the UE-preferred configuration is different from the current UE configuration.

2. The method of claim 1, wherein:
   the UE side information includes internet protocol (IP) traffic history, network status, and UE status;
   the detecting of the service type is based on the IP traffic history; and
   the estimating of the supportable throughput is based on the network status and the UE status.

3. The method of claim 1, further comprising:
   determining a state of a UE operational constraint, the state of the UE operational constraint being an ON state or an OFF state based on at least some of the UE side information, the ON state in which UE power saving features degrades a user experience of the application,
   wherein determining the UE-preferred configuration comprises determining the UE-preferred configuration based on the state of the UE operational constraint.

4. The method of claim 3, wherein determining the UE-preferred configuration comprises:
   calculating a margin between the estimated supportable throughput and an application-specified throughput;
   comparing the margin to a threshold that is greater than or equal to the application-specified throughput;
   selecting a UE-power saving configuration as the UE-preferred configuration, in response to a determination that the margin exceeds the threshold; and
   selecting a throughput-increasing configuration as the UE-preferred configuration, in response to a determination that the margin does not exceed the threshold.

5. The method of claim 4, wherein determining the UE-preferred configuration comprises:
   determining the UE-preferred configuration based on a selected service type, wherein the selected service type is one selected from the detected service type and a modified service type that is different from the detected service type; and
   selecting the selected service type based on the determined state of the UE operational constraint by:
      in response to determining that UE operational constraint is in the OFF state, selecting the detected service type as the selected service type, the selected service type being a first service type that corresponds to a first quality of user experience that corresponds to the application-specified throughput; and in response to determining that UE operational constraint is in the ON state:

selecting the modified service type as the selected service type, wherein the modified service type is a second service type that corresponds to a second quality of user experience that is a less quality of user experience than the first quality, the second quality of user experience corresponding to a reduced throughput that prioritizes power savings; and modifying the application-specified throughput to be the reduced throughput, wherein calculating the margin comprises calculating the margin between the estimated supportable throughput and the modified application-specified throughput that is the reduced throughput.

6. The method of claim 1, wherein the UE-preferred configuration comprises a recommendation that includes at least one of an RRC-inactive state and a DRX parameter.

7. The method of claim 1, further comprising:
generating a prediction of a UE configuration that is likely to be accepted by the external network device, the predicted UE configuration being a result of executing a multi-arm bandit (MAB) reinforcement-learning algorithm on an MAB database, the UE-preferred configuration, and at least one of:
a current location of the UE, and
a time of day at the UE; and
in response to determining that the UE-preferred configuration is different from the predicted UE configuration, not transmitting the UE-preferred configuration, and
transmitting the UE-preferred configuration to the external network device in response to a determination that the predicted UE configuration is different from the current UE configuration.

8. A user equipment (UE) comprising:
a transceiver;
a processor operably coupled to the transceiver, the processor configured to:
obtain UE side information;
based on the obtained UE side information, detect a service type of an application executing on the UE and estimate a supportable throughput;
determine a UE-preferred configuration based on the detected service type and the estimated supportable throughput;
determine whether the UE-preferred configuration is different from a current UE configuration;
control transmission of the UE-preferred configuration to an external network device, based on a result of the determination of whether the UE-preferred configuration is different from the current UE configuration.

9. The UE of claim 8, wherein:
the UE side information includes internet protocol (IP) traffic history, network status, and UE status; and
the processor is further configured to:
detect the service type based on the IP traffic history; and
estimate the supportable throughput based on the network status and the UE status.

10. The UE of claim 8, wherein the processor is further configured to:
determine a state of a UE operational constraint, the state of the UE operational constraint being an ON state or an OFF state based on at least some of the UE side information, the ON state in which UE power saving features degrades a user experience of the application; and
determine the UE-preferred configuration based on the state of the UE operational constraint.

11. The UE of claim 10, wherein to determine the UE-preferred configuration, the processor is configured to:
calculate a margin between the estimated supportable throughput and an application-specified throughput;
compare the margin to a threshold;
select a UE-power saving configuration as the UE-preferred configuration, in response to a determination that the margin exceeds or is equal to the threshold; and
select a throughput-increasing configuration as the UE-preferred configuration, in response to a determination that the margin does not exceed the threshold.

12. The UE of claim 11, wherein the processor is further configured to determine the UE-preferred configuration by:
determining the UE-preferred configuration based on a selected service type, wherein the selected service type is one selected from the detected service type and a modified service type that is different from the detected service type; and
selecting the selected service type based on the determined state of the UE operational constraint by:
in response to determining that UE operational constraint is in the OFF state, selecting the detected service type as the selected service type, the selected service type being a first service type that corresponds to a first quality of user experience that corresponds to the application-specified throughput; and
in response to determining that UE operational constraint is in the ON state:
selecting the modified service type as the selected service type, wherein the modified service type is a second service type that corresponds to a second quality of user experience that is a less quality of user experience than the first quality, the second quality of user experience corresponding to a reduced throughput that prioritizes power savings; and
modifying the application-specified throughput to be the reduced throughput,
wherein calculating the margin comprises calculating the margin between the estimated supportable throughput and the modified application-specified throughput that is the reduced throughput.

13. The UE of claim 8, wherein the UE-preferred configuration comprises a recommendation that includes at least one of an RRC-inactive state and a DRX parameter.

14. The UE of claim 8, wherein the processor is further configured to:
generate a prediction of a UE configuration that is likely to be accepted by the external network device, the predicted UE configuration being a result of executing a multi-arm bandit (MAB) reinforcement-learning algorithm on an MAB database, the UE-preferred configuration, and at least one of:
a current location of the UE, and
a time of day at the UE; and
in response to determining that the UE-preferred configuration is different from the predicted UE configuration, not transmit the UE-preferred configuration, and transmit the UE-preferred configuration to the external network device in response to a determination that the predicted UE configuration is different from the current UE configuration.

15. A non-transitory computer readable medium comprising program code that, when executed by a processor of a user equipment (UE), causes the UE to:
   obtain UE side information;
   based on the obtained UE side information, detect a service type of an application executing on the UE and estimate a supportable throughput;
   determine a UE-preferred configuration based on the detected service type and the estimated supportable throughput;
   determine whether the UE-preferred configuration is different from a current UE configuration;
   control transmission of the UE-preferred configuration to an external network device, based on a result of the determination of whether the UE-preferred configuration is different from the current UE configuration.

16. The non-transitory computer readable medium of claim 15, wherein:
   the UE side information includes internet protocol (IP) traffic history, network status, and UE status;
   non-transitory computer readable medium further comprises program code that, when executed by the processor of the UE, causes the UE to:
      detect the service type based on the IP traffic history; and
      estimate the supportable throughput based on the network status and the UE status.

17. The non-transitory computer readable medium of claim 15, further comprising program code that, when executed by the processor of the UE, causes the UE to:
   determine a state of a UE operational constraint, the state of the UE operational constraint being an ON state or an OFF state based on at least some of the UE side information, the ON state in which UE power saving features degrades a user experience of the application; and
   determine the UE-preferred configuration based on the state of the UE operational constraint.

18. The non-transitory computer readable medium of claim 17, wherein the program code that, when executed by the processor of the UE, causes the UE to:
   calculate a margin between the estimated supportable throughput and an application-specified throughput;
   compare the margin to a threshold;
   select a UE-power saving configuration as the UE-preferred configuration, in response to a determination that the margin exceeds or is equal to the threshold; and
   select a throughput-increasing configuration as the UE-preferred configuration, in response to a determination that the margin does not exceed the threshold.

19. The non-transitory computer readable medium of claim 18, further comprising program code that, when executed by the processor, causes the UE to determine the UE-preferred configuration by:
   determining the UE-preferred configuration based on a selected service type, wherein the selected service type is one selected from the detected service type and a modified service type that is different from the detected service type; and
   selecting the selected service type based on the determined state of the UE operational constraint by:
      in response to determining that UE operational constraint is in the OFF state, selecting the detected service type as the selected service type, the selected service type being a first service type that corresponds to a first quality of user experience that corresponds to the application-specified throughput; and
      in response to determining that UE operational constraint is in the ON state:
         selecting the modified service type as the selected service type, wherein the modified service type is a second service type that corresponds to a second quality of user experience that is a less quality of user experience than the first quality, the second quality of user experience corresponding to a reduced throughput that prioritizes power savings; and
         modifying the application-specified throughput to be the reduced throughput,
   wherein calculating the margin comprises calculating the margin between the estimated supportable throughput and the modified application-specified throughput that is the reduced throughput.

20. The non-transitory computer readable medium of claim 15, wherein the UE-preferred configuration comprises a recommendation that includes at least one of an RRC-inactive state and a DRX parameter.

* * * * *